(12) United States Patent
Buscema

(10) Patent No.: US 7,877,342 B2
(45) Date of Patent: Jan. 25, 2011

(54) NEURAL NETWORK FOR PROCESSING ARRAYS OF DATA WITH EXISTENT TOPOLOGY, SUCH AS IMAGES AND APPLICATION OF THE NETWORK

(75) Inventor: Paolo Massimo Buscema, Rome (IT)

(73) Assignee: Semeion, Rome (IT)

( * ) Notice: Subject to any disclaimer, the term of this patent is extended or adjusted under 35 U.S.C. 154(b) by 756 days.

(21) Appl. No.: 10/569,354

(22) PCT Filed: Aug. 18, 2004

(86) PCT No.: PCT/EP2004/051821

§ 371 (c)(1), (2), (4) Date: May 22, 2007

(87) PCT Pub. No.: WO2005/020132

PCT Pub. Date: Mar. 3, 2005

(65) Prior Publication Data

US 2007/0233624 A1  Oct. 4, 2007

(30) Foreign Application Priority Data

Aug. 22, 2003 (EP) .................................. 03425559

(51) Int. Cl.
*G06E 1/00* (2006.01)
*G06E 3/00* (2006.01)
*G06G 7/00* (2006.01)
*G06F 17/00* (2006.01)
*G06N 5/02* (2006.01)

(52) U.S. Cl. ........................ 706/20; 706/48; 706/924
(58) Field of Classification Search .................. 706/20, 706/48, 924
See application file for complete search history.

(56) References Cited

U.S. PATENT DOCUMENTS 5,140,670 A * 8/1992 Chua et al. .................... 706/20

(Continued)

OTHER PUBLICATIONS

Chua,L.O. et al. "Cellular Neural Networks: Applications", IEEE Trans. on Circuits and Systems, vol. 35, No. 10, pp. 1273-1290, IEEE, Oct. 1988.*

(Continued)

*Primary Examiner*—David R Vincent
*Assistant Examiner*—Benjamin Buss
(74) *Attorney, Agent, or Firm*—Themis Law

(57) ABSTRACT

A neural network for processing arrays of data with pertinent topology includes a n-dimensional array of cells (Ki) corresponding to the knots of the neural network, each cell having connections to the directly adjacent cells (Kj) forming the neighborhood of a cell (Ki), Each cell (Ki) has inputs for each connection to directly adjacent cells; an output for the connection to one or more of the directly adjacent cells (Kj), the connection between the cells being determined by weights (wij), and each cell being characterized by an internal value and being able to carry out signal processing for generating a cell output signal (ui), The output signal (ui) of a cell (Ki) is a function of its internal value and of the input signals from the neighboring cells, each cell being associated univocally to a record of a n-dimensional database (Pi) with pertinent topology and the value of each data record being the starting value of the corresponding cell. Processing is carried out by considering the internal value or the output value (ui) of each cell (Ki) after a certain number of iterative processing steps of the neural network as the new obtained value (Ui) for the univocally associated data records (Pi).

44 Claims, 14 Drawing Sheets

U.S. PATENT DOCUMENTS

| | | | |
|---|---|---|---|
| 5,790,758 A * | 8/1998 | Streit | 706/20 |
| 5,912,986 A * | 6/1999 | Shustorovich | 382/156 |
| 6,011,295 A * | 1/2000 | Merrill et al. | 257/443 |
| 6,028,956 A * | 2/2000 | Shustorovich et al. | 706/20 |
| 2002/0168100 A1* | 11/2002 | Woodall | 382/156 |

OTHER PUBLICATIONS

Guzelis, C. et al. "Recurrent perceptron learning algorithm for completely stable cellular neural networks", Proc. of the 3rd IEEE International Workshop on Cellular Neural Networks and Their Applications (CNNA-94), pp. 177-182, IEEE, Dec. 1994.*

* cited by examiner

Reduction about 80%

IAC with
Ar on Cm

CM

Zooming

IAC with
Ar on Cm

CM

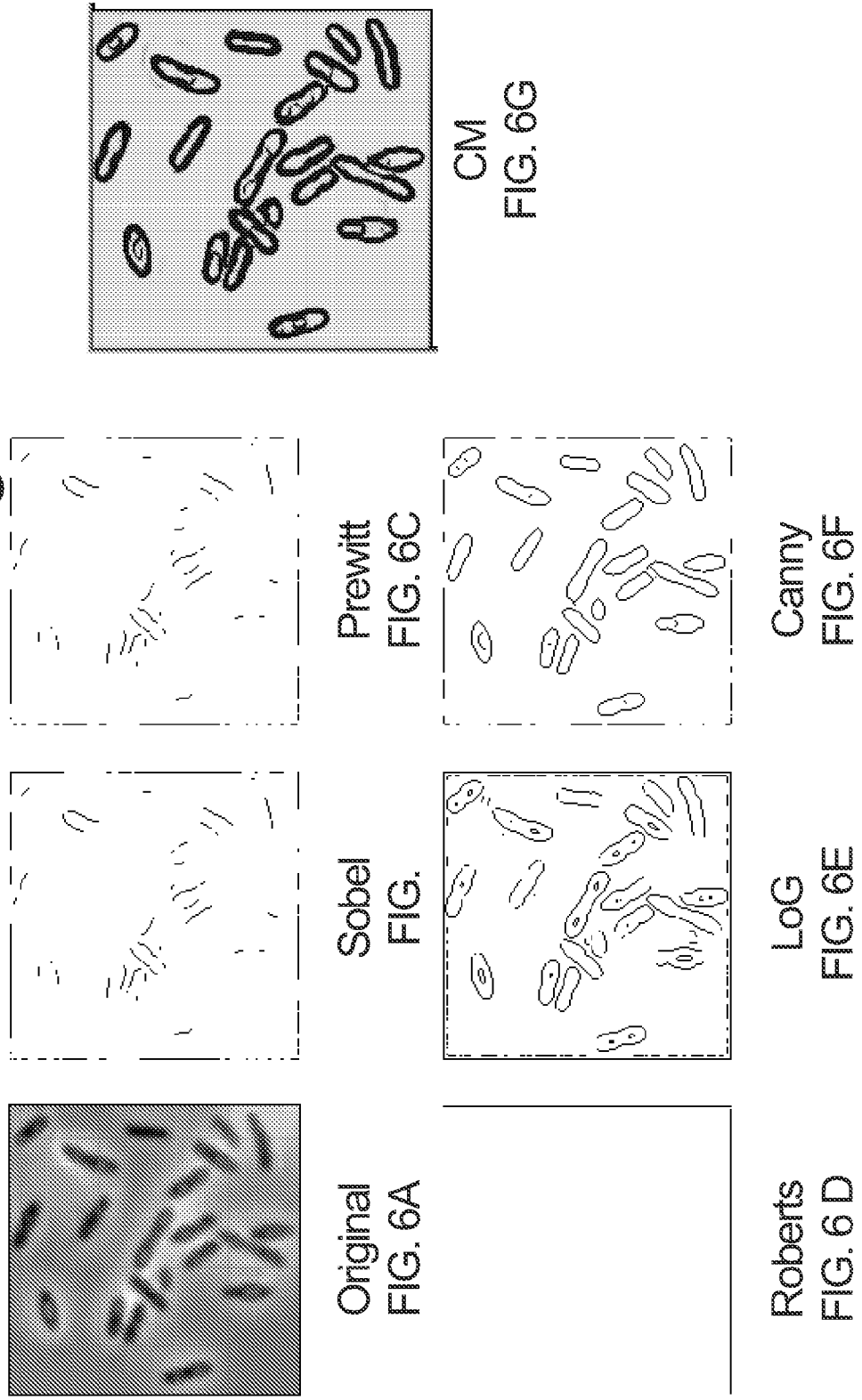

Ventricle

Original

Snake

ACM

DYNAMIC IMAGING OF METASTASES
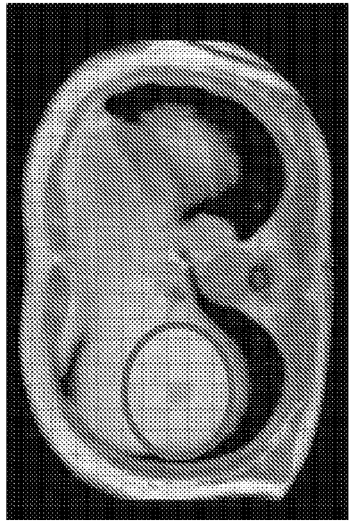
Late phase FIG. 8D
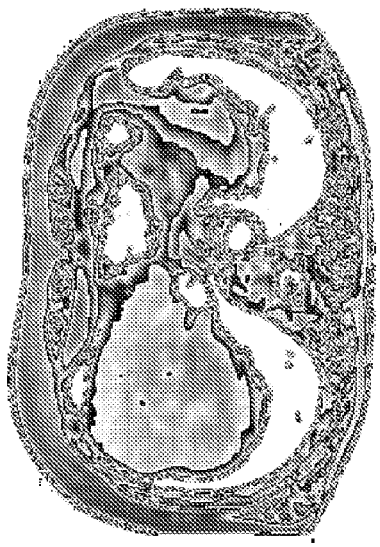
Precontrast – CM
FIG. 8E
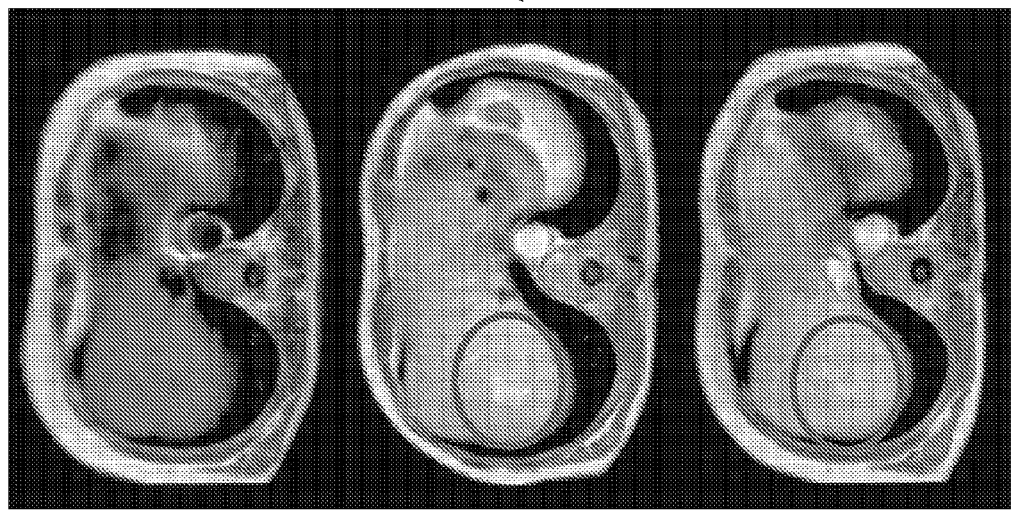
Precontrast
FIG. 8A
Arterial phase
FIG. 8B
Balance Phase
FIG. 8C

Lung
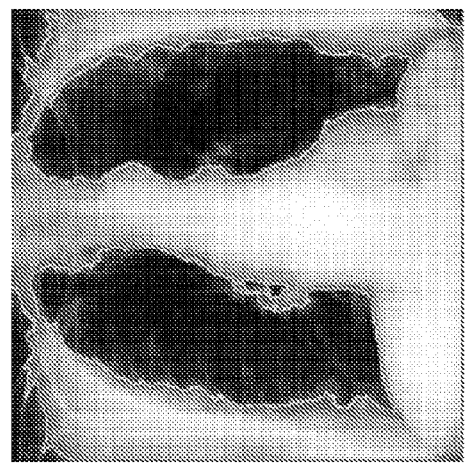
FIG. 9A — Original
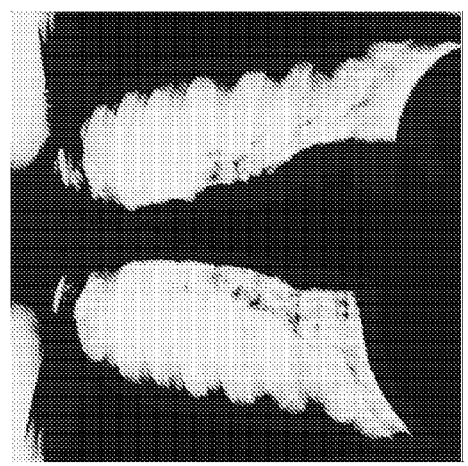
FIG. 9B — C
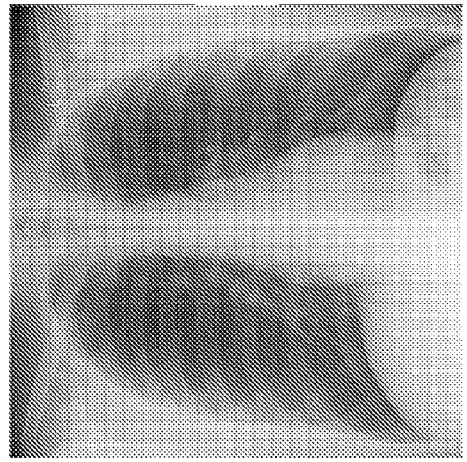
FIG. 9C — Best
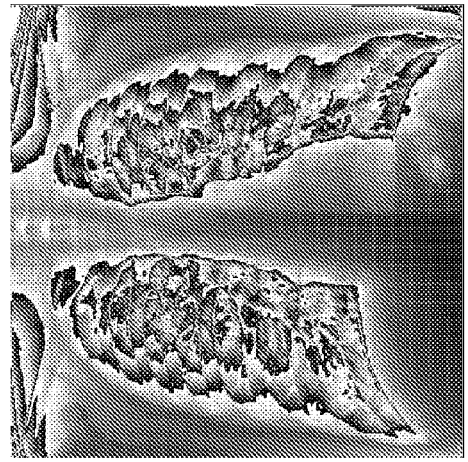
FIG. 9D — ACM (lac con Cm)

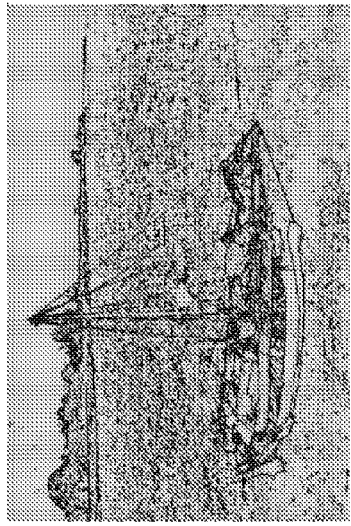
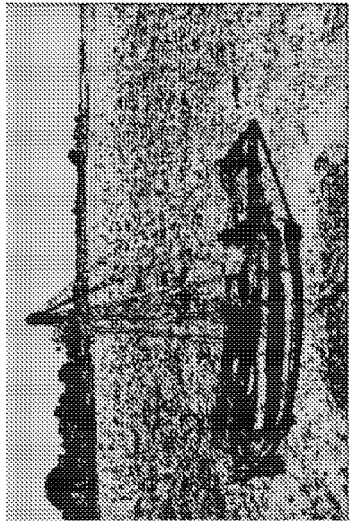
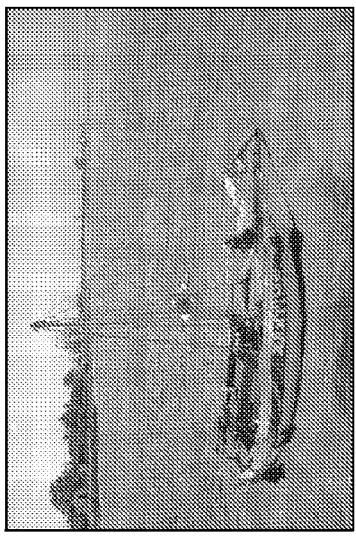
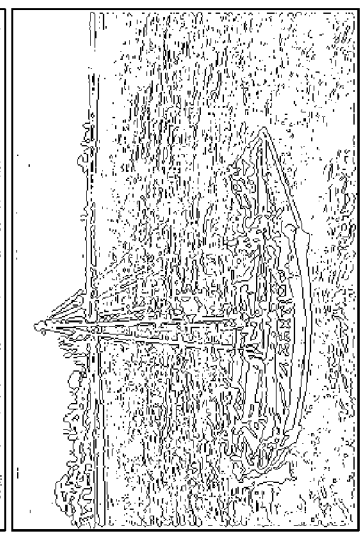
Original
FIG. 11A
Canny
FIG. 11B
Log
FIG. 11C
IAC
FIG. 11D
IAC on Cm
FIG. 11E

SOURCE

CM Rem

CM Quot

CM Quot + Rem

CM True Color

LS1

CM Rem + Quot on LS2

CM Rem on LS2

CM Quot on LS2          CM True Color on LS2

NEURAL NETWORK FOR PROCESSING ARRAYS OF DATA WITH EXISTENT TOPOLOGY, SUCH AS IMAGES AND APPLICATION OF THE NETWORK

CROSS REFERENCE TO RELATED APPLICATIONS

This application is the United States national stage filing of corresponding international application number PCT/EP2004/051821, filed on Aug. 18 2004, which claims priority to and benefit of European Application No. 03425559.6, filed on Aug. 22, 2003, each of which is hereby incorporated herein by reference.

The present invention relates to a neural network for processing arrays of data with pertinent topology, an algorithm for recognizing relationships between data of a database and a method for image pattern recognition based on the neural network and on the algorithm.

More particularly, the present invention relates to a neural network for processing arrays of data with pertinent topology that includes a n-dimensional array of cells (Ki) corresponding to the knots of the neural network, each cell having connections to the directly adjacent cells (Kj) forming the neighborhood of the a cell (Ki);

a) each cell (Ki) having an input for each connection to a directly adjacent cell of the surrounding cells (Kj);

b) each cell (Ki) having an output for the connection to one or more of the directly adjacent cells (Kj);

c) the connection between each cell (Ki) and the directly adjacent cells being determined by weights (wij);

d) each cell being characterized by an internal value defined as the activation value or function (Ai) of the cell (Ki);

e) each cell (Ki) being able to carry out signal processing according to a signal processing function so called transfer function for generating a cell output signal (ui);

f) the transfer function determining the output signal (ui) of a cell (Ki) as a function of the activation value or function (Ai) of the cell (Ki), which transfer function comprising also the identity function which puts the activation value or function (Ai) of the cell (Ki) equal to the output signal (ui) of a cell (Ki);

g) a n-dimensional database of input data records (Pi) being provided which has to be submitted to computation by means of the neural network and in which n-dimensional database the relative position of the data records (Pi) when projected in a corresponding n-dimensional space is a relevant feature of the data records (Pi), the data records (Pi) of the database being able to be represented by an array of points in the n-dimensional space, each point having an univocally defined position in the array of points and being univocally related to a data record (Pi) of the database, each data record (Pi) of the database comprising further at least one variable or more variables each one having a certain value (Ui);

h) each data record (Pi) being univocally associated to a cell (Ki) of the n-dimensional array of cells forming the neural network which cells (Ki) has the same position in the n-dimensional array of cells (Ki) as the corresponding data record (Pi) represented by a point in the n-dimensional array of points;

i) the value (Ui) of the variables of each data record (Pi) being considered as the initialization value of the network being taken as the initial activation value (Ai) or the initial output value (ui) of the univocally associated cell (Ki);

j) the activation value (Ai) or the output value (ui) of each cell (Ki) after a certain number of iterative processing steps of the neural network being considered as the new obtained value (Ui) for the univocally associated data records (Pi).

The present invention applies to the field of artificial intelligence and hence to machines having a computational unit, which is able to carry out simple processes as for example learning processes from empiric experience, deductive processes, cognitive processes by means of which collected or inputted data is analyzed for discovering or investigating certain relationships between data records, which at a first superficial glance may not appear evident or recognition processes by means of which voices, patterns, figures, letters or the like are recognized for further processing.

All the above mentioned processes are useful in order to put the machine in a condition to be able to take decisions on certain reactions or for simple classification aims of the data collected or inputted for example for further use.

Actually, given a database in which data are in the form of records each one being identified by related values of a certain defined number of variables, the relationships between the data records can be investigated by means of the so called "non supervised algorithms".

Known non supervised algorithm are for example the so called SOM, i.e. Self Organizing Map, which as an output furnishes a grid having a certain numbers of units each one individuated by a cell and in each grid being collected a certain number of the data records belonging to a certain prototype of data record. The SOM is a known algorithm which is described in greater details in KOHONEN, 1995: T. Kohonen, Self Organising Maps, Springer Verlag, Berlin, Heidelberg 1995 or Massimo Buscema & Semeion Group "Reti neurali artificiali e sistemi sociali complessi", Year 1999, Edizioni Franco Angeli s.r.l. Milano, Italy, chapter 12.

This clustering can give information about the similarity of the records one with the other and so allow to carry out data classifications or to recognize relationships which can be used by a machine for deciding how to carry put a task or if a task has to be carried out or which kind of task has to be carried out.

This algorithm however is not very effective in recognizing relationships of certain type between data records particularly data records where the relative position of the data records is in an array of data record or in a distribution of data records in a N-dimensional space, particularly where a two or three dimensional space is a relevant feature of the data record. Furthermore the data records are passive elements of the process.

Different kind of traditional artificial neural networks can be used. These artificial neural networks are characterized by knots. The knots are processing cells which are connected with each other in order to for a network. The artificial neural networks are modeled on the neuron networks of the brain. In this case, each knot of the network represents an artificial neuron. The knots are arranged in layers. In a a simplest configuration an input layer of knots is connected with an output layer of knots. The number of knots corresponds normally to the different data records or variables of a database. In a biological case, a neuron comprises three essential parts: a neuron cell body, branching extensions called dendrides for receiving input and an axon that carries the neuron's output to the dendrides of other neurons. Generally speaking, a neuron sends its output to other neurons via its axon. An axon carries information through a series of action potentials, or waves of current, that depend on the neuron's potential. This process is often modeled as a propagation rule represented by a net value. A neuron collects signals at its synapses by summing all the excitatory and inhibitory influences acting on it. If the excitatory influences are dominant, then the neuron fires and sends this message to other neurons via the outgoing synapses. In this sense the neuron function can be modeled as a simple threshold function. In the artificial neural networks the same model is used and each knot has inputs connected to the output of some or each other knot of a preceding layer of knots and an output connected to some or each other knots of a subsequent layer of knots. The excitation or inhibition level exercised by the outputs of other knots connected to the input of a knot is determined by a connection strength which is defined by weights. If the sum of the signals inputted to a knot exceeds a certain threshold value the knot will fire and the output will send out a signal. The internal state or value of a knot is defined as an activation function.

By processing data with this traditional kind of artificial neural networks, the data are fed to the knots of the input layer and the result of the process is furnished at the outputs of the knots of the output layer. For better and deeper understanding of the structure of artificial neural networks see "Reti Neurali Artificiali e Sistemi Sociali Complessi" Volume I, by Massimo Buscema & Semeion Group, Semeion Centro Ricerche, Franco Angeli Milano 1999 (ISBN 88-464-1682-1). For determining the weights defining connection strength artificial neural network are subjected to a training process in which the data of a data base are inputted for which data the processing output data are known. The network is fed with the input data and with the known output data and the connection weights are computed such that the given input and output data are matched by the weights.

When considering processing of a database which has a pertinent topology, this that the data can be projected as points in a n-dimensional space, where the relative position of the points representing the data is a relevant feature of the data themselves, such as for example the two dimensional array of pixels forming an image, the above mentioned traditional algorithms do not consider the topologic feature, for example the position of the pixel in the image in relation to the other pixels and furthermore the processing is not carried out in parallel for each pixel.

A solution of this problem has been attempted by using so called cellular automata or their improvement as cellular neural networks. Document U.S. Pat. No. 5,140,670 and document "Cellular Neural Networks: Application" by Leon o. Chua and Ling Yang, I.E.E.E. Trans. On Circuits & Systems vol. 35 (1988) October, No. 10, New York, N.Y., US discloses a combination of a so called cellular automata and neural networks which show the features of the artificial neural network disclosed above. This new kind of information-processing system is a large scale non linear analog circuit like neural networks, which circuit processes signal in real time. Like cellular automata it is made of a massive aggregate of regularly spaced circuits clones, called cells, which communicate with each other directly only through their nearest neighbors. Cells not directly connected together may affect each other indirectly because of the propagation effects of the continuous-time dynamics of cellular neural network. The cellular neural networks are able to carry out feed-back and feed-forward operations. The connection among cells is uniform and local. This means that a cellular neural network can be characterized by templates of its feed-back and feed forward operators. These operators define the dynamic behavior of the cellular neural network. These operators are finite constants or square matrices of coefficients, a so called cloning template which defines the dynamic rule of the cellular neural network. Thus in a cellular neural network different kind of operators can be used which are predefined and independent of the particular values of the data of the array of data to be processed, each operator being specifically defined in order to carry out a particular operation of the data for extracting or highlighting features from the data or relations among the data. Normally a library of such operator templates, so called genes, is provided from which one or more operator templates are chosen and used to carry out the data processing desired. So, for example, when considering a two dimensional image an operator or a gene can be provided for detecting and highlighting edges, a further operator or gene can be provided for sharpening and so on. The operators can be sequentially used for processing the data in order to obtain a combination of their effects on the output image.

From the above it is clear that although the known cellular automata take into consideration the fact that the data are topologically pertinent as defined above, nevertheless the operators are made of constants and are completely independent from the values of the data to be processed. Comparing this behavior to a neural network, this means that the weight defining the signal propagation to the input of a knot from the output of a knot of the directly surrounding layer of knots, are predefined and independent from the internal values of the knots which correspond to the activation values or to the output values of a knot in an artificial neural network. Thus the intrinsic information contained in the array of data due to their topologic relation ship and to their values is lost or completely not considered.

The invention aims to provide for an improved artificial neural network which combines the advantages of the structure of a cellular neural network or of a cellular automata with the advantages of a dynamic definition of the operators, taking into account the information that is intrinsically contained in the relation of the values of the data in an array data.

As a special case, the invention aims to provide a new artificial neural network having the structure of the cellular neural network and which allows parallel processing of image data without losing the information related to the relation between the values of the pixels forming the image.

The invention achieves the above goals by means of an artificial neural network comprising a n-dimensional array of cells ($K_i$) corresponding to the knots of the neural network, each cell having connections to the directly adjacent cells ($K_j$) forming the neighborhood of the a cell ($K_i$);

a) each cell ($K_i$) having an input for each connection to a directly adjacent cell of the surrounding cells ($K_j$);

b) each cell ($K_i$) having an output for the connection to one or more of the directly adjacent cells ($K_j$);

c) the connection between each cell ($K_i$) and the directly adjacent cells being determined by weights ($w_{ij}$);

d) each cell being characterized by an internal value defined as the activation value or function ($A_i$) of the cell ($K_i$);

e) each cell ($K_i$) being able to carry out signal processing according to a signal processing function so called transfer function for generating a cell output signal ($u_i$);

f) the transfer function determining the output signal ($u_i$) of a cell ($K_i$) as a function of the activation value or function ($A_i$) of the cell ($K_i$), which transfer function includes also the identity function which puts the activation value or function ($A_i$) of the cell ($K_i$) equal to the output signal ($u_i$) of a cell ($K_i$);

g) a n-dimensional database of input data records ($P_i$) being provided which has to be submitted to computation by means of the neural network and in which n-dimensional database the relative position of the data records ($P_i$) when projected in a corresponding n-dimensional space is a relevant feature of the data records ($P_i$), the data records ($P_i$) of the database being able to be represented by an array of points in the n-dimensional space, each point having an univocally defined position in the array of points and being univocally related to a data record ($P_i$) of the database, each data record ($P_i$) of the database comprising further at least one variable or more variables each having a certain value ($U_i$);

h) each data record ($P_i$) being univocally associated to a cell ($K_i$) of the n-dimensional array of cells forming the neural network, which cell ($K_i$) has the same position in the n-dimensional array of cells ($K_i$) as the corresponding data record ($P_i$) represented by a point in the n-dimensional array of points;

i) the value ($U_i$) of the variables of each data record ($P_i$) being considered as the initialization value of the network being taken as the initial activation value ($A_i$) or the initial output value ($u_i$) of the univocally associated cell ($K_i$);

j) the activation value ($A_i$) or the output value ($u_i$) of each cell ($K_i$) after a certain number of iterative processing steps of the neural network being considered as the new value ($U_i$) for the univocally associated data records ($P_i$), which artificial neural network further comprises the following features:

k) for each processing step of the certain number of iterative processing steps, the weights ($w_{ij}$) defining the connection between each cell ($K_i$) and the directly adjacent cells ($K_j$) are determined as the function of the current values ($U_j$) of the variables of each data record ($P_j$) univocally associated to the cell ($K_j$) directly adjacent to the cell ($K_i$), said function being a so called learning function or rule;

l) the current activation value ($A_i$) or the output value ($u_i$) of each cell ($K_i$) after a processing steps of the neural network which is considered as the current new value ($U_i$) for the univocally associated data records ($P_i$) being determined as a function of the current output values ($u_j$) of the directly adjacent cells ($K_j$) weighted by the corresponding weight ($w_{ij}$) defining the connection of the directly adjacent cells ($K_j$) with the cell ($K_i$).

As a variant, the above mentioned artificial neural network can be modified by determining the current activation value ($A_i$) or the output value ($u_i$) of each cell ($K_i$) after a processing steps of the neural network, which is considered as the current new value ($U_i$) for the univocally associated data records ($P_i$) as a function of the of the weights ($w_{ij}$) defining the connection of the directly adjacent cells ($K_j$) with the cell ($K_i$), the function being a so called activation function or rule.

The current activation value ($A_i$) or the output value ($u_i$) of each cell ($K_i$) after a processing steps of the neural network, which is considered as the current new value ($U_i$) for the univocally associated data records ($P_i$), can be determined as a function of the current output values ($u_j$) of the directly adjacent cells ($K_j$) and of the corresponding weight ($w_{ij}$) defining the connection of the directly adjacent cells ($K_j$) with the cell ($K_i$), said function being a so called activation function or rule.

Furthermore for each processing step of the certain number of iterative processing steps, the weights ($w_{ij}$) defining the connection between each cell ($K_i$) and the directly adjacent cells ($K_j$) are determined as the function of the current values ($U_j$) of the variables of each data record ($P_j$) univocally associated to the cell ($K_j$) directly adjacent to the cell ($K_i$) and of the current value ($U_i$) of the variables of the data record ($P_i$) univocally associated to the cell ($K_i$).

When the database is formed by the pixels of a two dimensional image, then the above neural network forms a machine for image processing according to the present invention.

Further improvements are disclosed in the following description and are the subject of the dependent claims.

The above artificial neural network according to the present invention is based on the following theoretical founding:

As an example a phenomenon is defined as each space-time set which can be measured in terms of adsorbed or emitted electromagnetic frequencies. A visual phenomenon is thus a sub set of the universe of the phenomenon as defined above, which sub set varies depending on the frequencies which one decides to observe. A visual phenomenon is a phenomenon having a pertinent topology. Any phenomenon can be analyzed by means of elements which are a priori determined by a model or the phenomenon can be forced to show the relations existing between minimum elements. Any element of a phenomenon is an explicit or implicit synthesis of minimum elements. Thus an element of a model can be considered as an index reducing the original information being present in the minimum elements. This reduction can be critical since it is possible that the elements of the model ignore some properties which are present in the minimum elements and in their local interactions. In analyzing visual phenomenona, or other phenomena having a pertinent topology, the reduction carried out by the elements of the model is serious. Indeed with some index as for example mean values, variance and every other index based on a mean value will not maintain the topological properties of the minimum elements being synthesized. For example, the mean value of two rectangular triangles will not generate a rectangular triangle except in very rare cases.

Further, every phenomenon which we can observe as a subject of scientific knowledge is a phenomenon having a pertinent topology. Due to the only fact that a shape can exist, in a theoretically isotropic space every shape shows with its topology its specific pertinence. Any kind of scientific model has the aim to let appear for every phenomenon its inherent model by means of the interaction of minimum elements of the phenomenon. Having found the minimum elements of a phenomenon, the scientific model should furnish to the elements equations by means of which said elements interact one with the other. When by means of said equation the minimum elements of a phenomenon are able to reconstruct the phenomenon itself in its morphological and dynamical complexity, then the equations can be said to be a good meta-model of the model which the minimum elements has caused. Without a reconstruction proof there is no validation of the scientific activity.

Every phenomenon in order to be subject of scientific knowledge must be able to be quantitatively characterized. This means that its minimum elements and their relations must be able to be represented by numerical values. From the point of view of physics this numerical values describes "forces" and/or the "results" of the forces exercised. The interactions between these numerical values within specific equations can allow the reconstructive proof of the measure with which the meta-model (i.e. the equations) generate a model which is similar to the phenomenon which has to be understood. Thus the aim of the scientific knowledge is to define the mathematical functions being implicit in a phenomenon. When the mathematical function is relatively complex, i.e. highly non linear, it is probable that our perception of the phenomenon oblige us to define the phenomenon as being provided with qualitative features which cannot be reduced only to quantitative effects. This anyway is only a perceptive effect due to the complexity which characterizes the function implicit in the phenomenon. It is thus possible to state that the quantitative component of every phenomenon is the perceptive effect of its highly quantitative non linearity. Considering that all the phenomenon which are present in nature evolve with highly non linear dynamics, it is obvious that the perception of qualitative effects is so common to let one think that the quality is inherent in the phenomenon itself. In reality the difference between quantity and quality does not exist. Quality is the way with which the quantity expresses its virtuosity.

In any phenomenon having pertinent topology, the identity and the unity of the phenomenon is guarateed by its space-time cohesion. This means that every minimum element of the phenomenon is contiguous and connected directly or indirectly through specific forces to the other minimum elements. The quantitative value of each minimum element of the phenomenon which is analyzed is thus the result of the action of the said forces. It can be demonstrated that in a phenomenon with pertinent topology the forces connecting each minimum element with any other minimum element of the local neighborhood are sufficient to explain the space-time cohesion of the entire phenomenon.

Let us consider a phenomenon P comprising minimum elements $p_1, p_2, \ldots p_M$ in a space having D spatial dimensions, where D=2 for simplicity. Assuming now that the local neighborhood, N, of each minimum element is formed by a first layer of directly surrounding minimum elements, a so called a gradient 1 surrounding, in which 1 is referred to the a step. In a biodimensional space the local neighborhood is then formed by N=8 minimum elements. The phenomenon P can thus be represented by a matrix having M elements with M=R(rows)×C(columns):

$$\begin{matrix} p_{1,1} & p_{1,2} & p_{1,3} & \cdots & p_{1,C} \\ p_{2,1} & p_{2,2} & p_{2,3} & \cdots & p_{2,C} \\ \cdots & \cdots & \cdots & \cdots & \cdots \\ p_{R,1} & p_{R,2} & p_{R,3} & \cdots & p_{R,C} \end{matrix}$$

In this matrix each minimum element $P_{x,y}$ will, have a quantitative value for example a quantity of light which a reflector is able to reflect and which we can express as $u_{x,y}$, where $u \in \{0,1\}$. The element $p_{x,y}$ will have also connections with its local neighborhood N.

Defining now $W_{x,y,x+k,y+z}$ (with k and z integer and such that $k \in \{-1,1\}$ and $z \in \{-1,1\}$) as the forces of its connections with the minimum elements of its local neighborhood N it is possible to write now $$u_{x,y}^{[n+1]} = f(u_{x,y}^{[n]}, u_{x+k,y+z}^{[n]}, W_{x,y,x+k,y+z}^{[n]}), \text{ where } |k|+|z|>0; \quad (3.1)$$

from which the following equation can be derived:

$$u_{x,y}^{[n]} = f^{[n]}(u_{x,y}^{[0]}, u_{x-k,y+z}^{[0]}, W_{x,y,x+k,y+z}^{[0]}) \quad (3.2)$$

In other words: the quantitative value of each minimum element $p_{x,y}$ is a function of the quantitative value of the 8 minimum elements surrounding the element and of the forces which connect the minimum element to the surrounding elements.

In a more analytical language:

$$u^{[n+1]}_{x,y} = f[u_{x,y}^{[n]}, g_1(u^{[n]}_{x+1,y}, W^{[n]}_{x,y,x+1,y}), g_2(u^{[n]}_{x,y+1}, W^{[n]}_{x,y,x,y+1}), g_3(u^{[n]}_{x+1,y+1}, W^{[n]}_{x,y,x+1,y+1}), g_4(u^{[n]}_{x-1,y}, W^{[n]}_{x,y,x-1,y}), g_5(u^{[n]}_{x,y-1}, W^{[n]}_{x,y,x,y-1}), g_6(u^{[n]}_{x-1,y-1}, W^{[n]}_{x,y,x-1,y-1}), g_7(u^{[n]}_{x-1,y+1}, W^{[n]}_{x,y,x-1,y+1}), g_8(u^{[n]}_{x+1,y-1}, W^{[n]}_{x,y,x+1,y-1})]$$

If we begin with x=1 and y=1 recursively substituting at each n-th step $u^{[n]}_{x+k,y+z}$ the same function $f(\bullet)$ which we have calculated above, for $u_{x,y}$, than one can see that one easily reaches an index $x_C$ and $y_R$, which demonstrates that the quantitative value of each element $p_{x,y}$ depends from all the other elements.

From the above it results that by defining the strength of the connections between each minimum element of a phenomenon P and the minimum elements of its local neighborhood, one defines also the global connections strength of the entire phenomenon P.

Obviously this statement is valid only if it is assumed that the phenomena P has a dynamic behavior. From this it must be argued that each phenomenon having a pertinent topology is always a temporal process or the partial result of the temporal process.

By combining the ideas of local connectivity and time dynamics which characterize the phenomenon having pertinent topology on has to argue that these phenomenon has at the same time a parallel and a sequential behavior. This kind of asynchronous parallelism can be formalized.

Let us consider a phenomenon P with pertinent topology in a portion of a plane having two dimensions (D=2) and having elements that are squares of minimum sides L, which elements divide perfectly the plane in single tiles. In theses conditions one can evaluate the function by which the two minimum elements of P that are at the higher distance one from the other exercise a reciprocal influence one on the other. Assuming that each minimum element of P is directly connected to its local neighborhood of gradient 1 (g=1), the signal diffusion of each minimum element will take place t each time instant t according to the following equations:

$$\begin{cases} t = 1 \; g = 1 \\ I(t) = (2g_{(i)} + 1)^D - 1 \\ g_{(t+1)} = t + 1 \end{cases} \quad (3.3)$$

where I(t) is the number of the minimum elements of P which are influenced at the T-th temporal cycle by the signal of the reference minimum element. These equations represent the diffusion functions of the signal of a minimum element of a phenomenon P of any dimension D whatever.

It is further possible to define the time delay $\Delta t$ with which the two most distant minimum elements of P influence each other.

For a bidimensional situation with D=2 and knowing $P_{x_1,y_1}$ and $P_{x_2,y_2}$ are the two minimum elements defined above, the time delay is expressed by $$\Delta t = \sqrt{(x_1-x_2)^2 + (y_1-y_2)^2} + 1 \quad (3.4)$$

Furthermore, a phenomenon having a pertinent topology is formed by minimum elements and by local connections among the minimum elements. Each minimum element is defined by the position which it occupies in the phenomenon and by a quantitative value which indicates at each instant, for example, a characteristic effect of the phenomenon, such as for example the quantity of light being emitted or reflected by a reflector.

The above can be expressed as

Minimum element=$u_{x,y,z,\ldots D}^{[t]}$ where u is the quantitative value and x, y, z, . . . , D is the position and t is the time instant.

Each local connection defines the strength of the mutual influence of each minimum element on each other minimum element which is directly adjacent to the minimum element at each time instant. Each local connection is thus defined by the position of the minimum elements connected by it and by a quantitative value at each time instant, and this can be expressed as:

Local connection $= W_{(x,y,\ldots,D_s),(k,z,\ldots,D_d)}^{[t]}$ where W is the quantitative value, x, y, $D_s$ is the position of the source minimum element, t is the time instant, and k, z ... $D_d$ is the target minimum element.

Considering the above, an active matrix of the connections can be defined by the system of the following equations:

$$u_{x,y,\ldots,D_1}^{[t+1]} = f(u_{x,y,\ldots,D_s}^{[t]}, u_{k,z,\ldots,D_d}^{[t]}, W_{(x,y,\ldots,D_s),(k,z,\ldots,D_d)}^{[t]}) \quad (4a)$$

$$W_{(x,y,\ldots,D_s),(k,z,\ldots,D_d)}^{[t+1]} = g(u_{x,y,\ldots,D_d}^{[t]}, u_{k,z,\ldots,D_d}^{[t]}, W_{(x,y,\ldots,D_s),(k,z,\ldots,D_d)}^{[t]}) \quad (4b)$$

Equation (4a) and (4b) describe the evolution of the minimum elements and of the connections of a phenomenon with a pertinent topology towards an attracting element which represents the group of its solutions. Both equations can be present in two degenerated ways which request a particular attention:

As a first way $$u_{x,y,\ldots,D_s}^{[t+1]} = f(u_{x,y,\ldots,D_s}^{[t=0]}, u_{k,z,\ldots,D_d}^{[t=0]}, h(W_{(x,y,\ldots,D_d),(k,z,\ldots,D_d)}^{[t]})) \quad (4c)$$

In this case, the minimum elements of the phenomenon evolve only as a function of the connections, by starting from their original or starting quantitative value, which has the only effect of an impulse of the process. One particular feature of this evolution consists in the fact that the process regulating the evolution of the connections takes place in the space of the connections (equation (4b). It is in this space that the solution are found for the evolution of the minimum elements.

So in this case the starting values of the minimum elements act as simple constraint to the evolution of the connections. These last ones dynamically provide the values of the elements and thus the attracting element of such a process will be the new definition of any minimum element as an exclusively relational element, which is generated by the dynamic negotiation between its starting value and the starting value of the adjacent minimum elements.

The second degenerated case is described by the following equation:

$$u_{(x,y,\ldots,D_s),(k,z,\ldots,D_d)}^{[t+1]} = f(W_{(x,y,\ldots,D_s),(k,z,\ldots,D_d)}^{[0]}, u_{(x,y,\ldots,D_s)}^{[t]}, u_{(k,z,\ldots,D_d)}^{[t]}) \quad (4d)$$

In this case only the values of the minimum elements will evolve while their connections remain unchanged and the connections will act as constraints of the evolution process.

The above analysis of phenomena having pertinent topology based on the example of electromagnetic or visual phenomenon demonstrates clearly once again the limits of the known neural networks and particularly of the cellular neural networks. The networks disclosed in the state of the art does not completely fit with the structure of phenomena having pertinent topology, since the relation between interactions and quantitative values of the minimum elements is not considered, but the interactions are described by predefined models, i.e. operator templates, which structure is not influenced by the values of the minimum elements of the phenomenon. On the contrary, the artificial neural network according to the present invention is stepping closer to the structures of phenomena by considering the mutual relations of the quantitative values of the minimum elements formed by the data records of the database and the interactions between these minimum elements.

In the following description there are shown and described in more detail different sets of rules for describing the way with which the interactions between cells or knots of the present neural network and the quantitative value of the single cells or knots, i.e. their internal value or activation value or output value are related one to the other in order to guide the computational process of the network.

The invention relates also to an algorithm for recognizing relationships between data of a database, which algorithm can be more effective, rapid and precise in highlighting the relationships between the data of a database.

The algorithm according to the invention is an algorithm for recognizing relationships between data of a database having pertinent topology, this meaning that the data are of the kind where the relative position of the data records in an array of data records or in a distribution of data records in a N-dimensional space, particularly a two or three dimensional space is a relevant feature of the data record, and where the data records can be represented as an array of cells or points, each point being univocally related to a data record of the database and having a univocally defined position in the array relatively to the cells or points of the other data records, to each data record being further associated at least one or more variables, each having a certain value, the algorithm being characterized by the fact that:

each cell or point in the array of cells of points representing a data records of a database is considered to be a unit or a knot of an artificial neural network;

each unit or knot formed by a cell or point of the database being successively defined as a target unit or knot and connections being defined between each target unit or knot at least to each one of the rest of the units or knots formed by the rest of cells or points of the database, which are at least of gradient 1 relatively to the corresponding target unit or knot;

a new output value of each unit or knot of the database successively defined as target unit or knot being calculated by means of the set of learning rules or functions defining the strength of the connection between the units or knots or the set of activation rules or functions of the artificial neural network defining the quantitative value of each unit or knot i.e. its activation value or its output value, or by means of the combination of both the set of learning rules or functions and the set of activation rules or functions of the artificial neural network as a function of the actual output of the units or knots connected to the target unit or knot and of the actual output of the said target unit or knot;

the actual outputs of each unit or knot being defined as the value of the variable or as the values of the variables associated to each data record represented by a cell or a point considered as a unit or knot of the artificial neural network;

and the new output of the target unit or knot being considered as the new value of the variable or of the variables of the data record associated to the cell or point of the array of data records corresponding to the target unit or knot;

by carrying out the steps for computing a new output of a target unit or knot for at least part or for each cell or point of the array of data records a new array of data records is computed where the data record of each cell or point has a new value of the at least one variable or new values for the variables as a result of a first computation cycle of the artificial neural network according to the above steps;

said computation cycle being repeated for each successive new array of data records until a certain prefixed number of repetitions of the computation cycle has been carried out and/or unless a certain maximum allowable error or discrepancy has been reached between the original values of the variable or of the variables of the original array of data records with respect to the values of the variable or variables of the array of data records according to the one computed in the last cycle and/or unless the difference between the value of the variable or the values of the variables of data records in the sequence of array of data records computed in the sequence of cycles is lower than a predetermined maximum rate.

Many different sets of known learning functions or rules may be used or many different sets of known activation functions or rules may be used, which may also be combined. Each one of the sets or combination thereof can enhance or bring to evidence certain kinds of relations in a better way with respect to other kinds of relations between the data records.

According to a further improvement, the array of data records may be submitted at least twice or more times to elaboration according to the algorithm of the present invention, in a first phase being provided a first set of learning functions or rules or a first set of activation functions or rules or a combination thereof and in a second phase being provided a second set of learning functions or rules or a second set of activation functions or rules or a combination thereof and so on when more than two phases are provided, while the array of data-records being used in the second or further phases of elaboration with the algorithm of the present invention with the second or further different sets of learning or activation rules or functions or with a combination thereof is the array of data records resulting respectively from the first or from the previous phase of elaboration of the array of data records.

Although there is no need that the units or knots corresponding to the cells or points related to the data records of at least gradient 1 with respect of the unit or knot actually formed by the cell or point related to the target data record be the ones spatially directly surrounding the cell or point related to the actual target data record, in a special case particularly of a two or three dimensional array of data records the cells or points related to the data records of gradient 1 with respect to the cell or point of the target data record are formed by the data records associated to the cells or points of the data record array which directly surrounds the cell or point in the array of data record related to the target data record.

According to a further feature, in the case the new array of data records computed by the algorithm is based only on a set of learning functions or rules, the new output of each target data record is defined as a function of new weights characterizing the connection of each target unit or knot associated to the target data record with the units or knots represented by the cells or points of data records of gradient 1 relatively to the cell or point of the target data record, the set of learning rules or functions defining new weights of the connections as a function of the previous weights computed or defined in a previous computation cycle and as a function of the actual outputs of the unit or knot associated to the cell or point of the target data record and of the unit or knot associated to the cells or points of the data records of gradient 1 or of the data records of the cells or points directly surrounding the cells or point of the actual target data record.

A similar result may be reached by using sets of activation functions where these functions defines the new output of the target unit or knot corresponding to the cell or point related to the target data record based on the net input to the target unit or knot which is a function of the outputs of the units or knots corresponding to the cells or points associated to the data records of gradient 1 with respect to the target data record, particularly to the units or knots corresponding to the cells or points of the array of data records directly surrounding the cell or point of the target data record.

The learning phase starts with a fixed predetermined value of the weights for each connection while the starting value of the unit or knot is modified according to a predetermined function which is also function of the weights and of the value of the surrounding knots or units and therefore to the data records which correspond to cells or points in the array directly surrounding the cell or point representing a certain unit or knot of the artificial neural network.

A new data array is thus constructed in which each data record has maintained the position with respect to the other data records in the representation of the data records as cells or points in an array, while each data record has changed its value as a function of its original value and of the original values of the data records relative to the surrounding points in the array.

A new cycle can thus be executed in which again each point representing a data record is set as a unit or knot of an artificial neural network, a weight is defined for each connection between units, and a new value in the form of an output of each unit or knot is calculated according to the certain function.

Several different kinds and structures of known artificial neural network using different known and/or new learning functions for the definition of the weights and different functions for the calculation of the new values of each data record associated to each unit or knot may be used.

It is important to notice that since the weights of the connections between the knots of the artificial neural network are fixed at least at each cycle and are eventually equal for each connection, the algorithm according to the present invention has practically no internal noise and the noise is given only by the noise of the data of the database.

Different examples of sets of learning rules or functions and of known sets of activation rules or functions and of combinations thereof are disclosed in the following detailed description of some examples.

As it will appear more clearly in the following detailed examples different learning rules for determining the weights of the connections of the artificial neural network or different functions for calculating the outputs of the units or knots of the artificial neural network which corresponds to the new values of the data records, can be useful for enhancing certain kind of features of the data records.

The algorithm according to the present invention can find a simple and effective use in evaluating digital to digitalized images in order to recognize or put in evidence certain features of said images, as for example tissue differentiation, image pattern recognition and contrast enhancement.

Particularly, the algorithm according to the present invention can be used for image pattern recognition and for evidencing the different kinds of structures of the material forming a body, particularly of the tissues forming a biologic body in combination with radiological, echographic or magnetic resonance imaging or the like.

As it will appear more clearly from the detailed examples, the algorithm according to the present invention can be useful for evidencing different kinds of tissues and/or for substituting contrast medium in the diagnostic imaging.

In particular the different kind of revealed or enhanced information depends by the different set of learning and or activation rules applied to the neural network structure formed by the pixel array of the original image. Principally the effect obtained is similar to the one which can be obtained by using enhancing media such as contrast media in the echographic, radiographic, nuclear magnetic resonance imaging or in similar imaging methods.

The kind of information enhanced can furthermore be differentiated by the choice of a certain set of learning and/or activation rules. In general it is possible to recognize two families of this set of rules. The two families are summarized in the table of FIG. 3 in which the different sets of rules are given a name which will be explained later on in the detailed description.

A first family of rules provides for weight evolution and unit activation and allow to carry out an extraction of features from a source digital or digitalized image such as for example kind of tissue in an image of biological bodies or structures of tissues or objects like for example recognizing the presence of stenosis in angiographic images.

A second family comprises rules which principally carry out a weight optimization. After weight optimization a further step of unit activation can be carried out. This kind of rules helps in finding out edges between different zones of an image for recognizing boundaries, for example boundaries between different kinds of tissues in images of biological bodies.

The above example is not the only possible field of application of the algorithm according to the invention. Another example may consist in evaluating the relations and dependence between genes relatively to their common activation.

The invention relates also to a method for image pattern recognition in digital or digitalized images.

Particularly the invention relates to a method for the recognition and differentiation of different tissues in digital or digitalized images of biologic bodies, as for example in diagnostic images as for example digitalized radiographies or echographic images or magnetic resonance images.

It is important to notice that although the present description of the examples is referred particularly to a two dimensional array of data records, the algorithm and the method according to the invention are not limited to such a space but can be applied also on three and N dimensional arrays of data records.

The algorithm according to the invention and the method using the algorithm will appear more clearly form the following description of some examples by means of the annexed drawings.

FIGS. 4A, 4B, 4C, and 4D illustrate respectively a mammography, and the enlarged mammography, the digitalized mammography which has been subjected to the method for image pattern recognition according to the present invention and according to a particular learning law called CM, and the digitalized mammography which has been subjected to the method for image pattern recognition according to the present invention and according to further particular learning law called IAC.

Figure 4B:
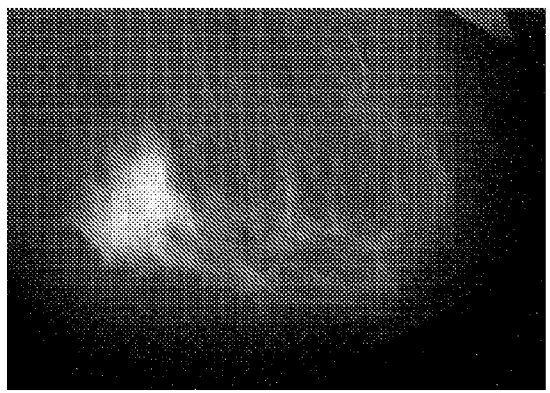
Figure 4D:
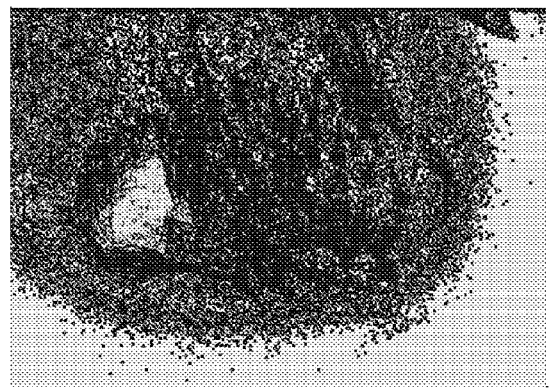
Figure 4A:
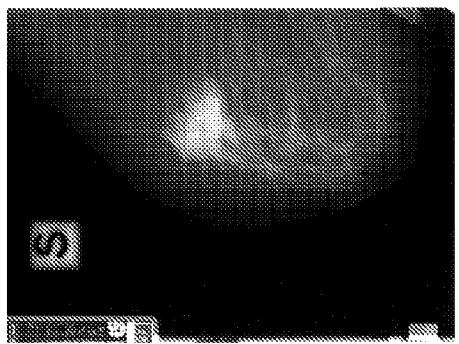
Figure 4C:
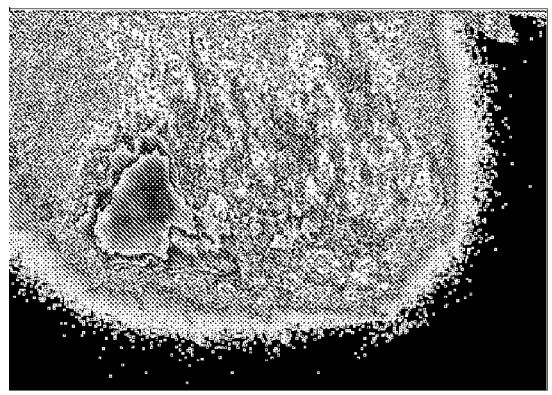

FIGS. 5A, 5B, 5C, 5D are respectively a repetition of FIG. 4A and a further enlargement of FIGS. 4B, 4C, 4D.

FIGS. 6A, 6B, 6C, 6D, 6E, 6F, 6G are respectively a photograph of bacteria and four digitalized images of FIG. 6A subjected to known pattern recognition methods while FIG. 6G illustrates the digitalized image of FIG. 6A subjected to the method according to the present invention using automata rules for the artificial neural network called IAC particularly enhancing contrast.

Figure 7A:
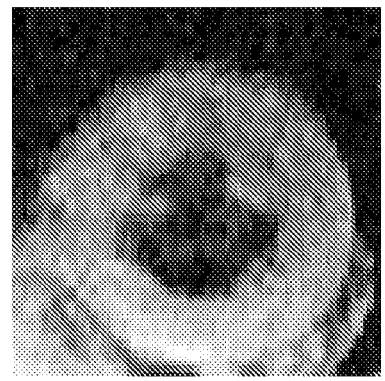
Figure 7B:
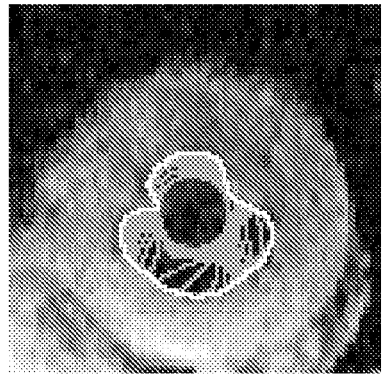
Figure 7C:
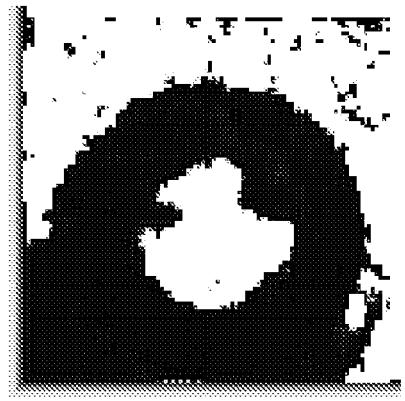

FIGS. 7A, 7B, 7C are a digital photo of the ventricle, the digitalized photo subjected to a known pattern recognition method and the digitalized photo subjected to a method according to the invention called CM.

FIGS. 8A, 8B, 8C, 8D and 8E show a set of echographic images of the same body part where metastases are present and where FIGS. 8A to 8D are respectively an image without contrast media, with contrast media in the arterials phase, an image with contrast media in balance, an image with contrast media with in a late phase, the image of the same body part, without contrast media and treated with the method according to the present invention.

FIGS. 9A, 9B, 9C, 9D are respectively a radiographic image of the lung, the digitalized image of FIG. 8A subjected to a known algorithm called best filter, the image of FIG. 8A subjected to a treatment according to the present invention and with an rule called CM, and the image of FIG. 8A subjected to a treatment according to the present invention and with an automotive rule called IAC.

Figures 10A, 10B, 10C:
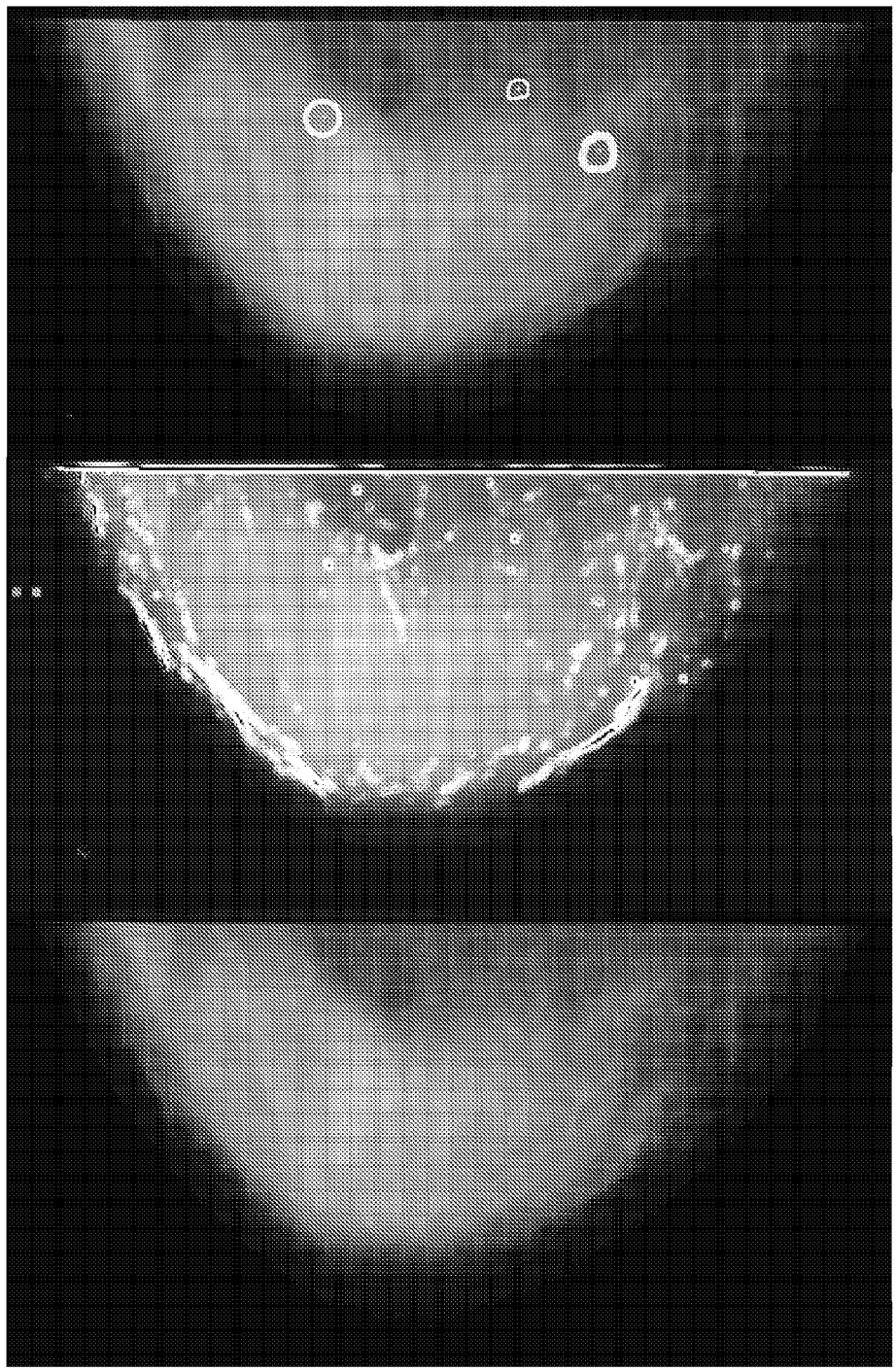

FIGS. 10A, 10B, 10C illustrate respectively a mammography, the mammography of FIG. 10A treated with a known pattern recognition method and the mammography of FIG. 10A treated according to the method of the present invention with an automotive rule called High CS.

FIGS. 11A, 11B, 11C, 11D and 11E illustrate respectively a normal photograph, the photographs according to FIG. 11A treated by two different known patter recognition methods and the photograph of FIG. 11A treated with the method according to the present invention with two different automotive rules called IAC and IAC combined with CM.

FIGS. 12A to 12J illustrates respectively a radiographic source image of the anatomical district of the femoral artery and the image elaborated according to the present invention by using different kind of rules and different combination thereof.

Figure 13:
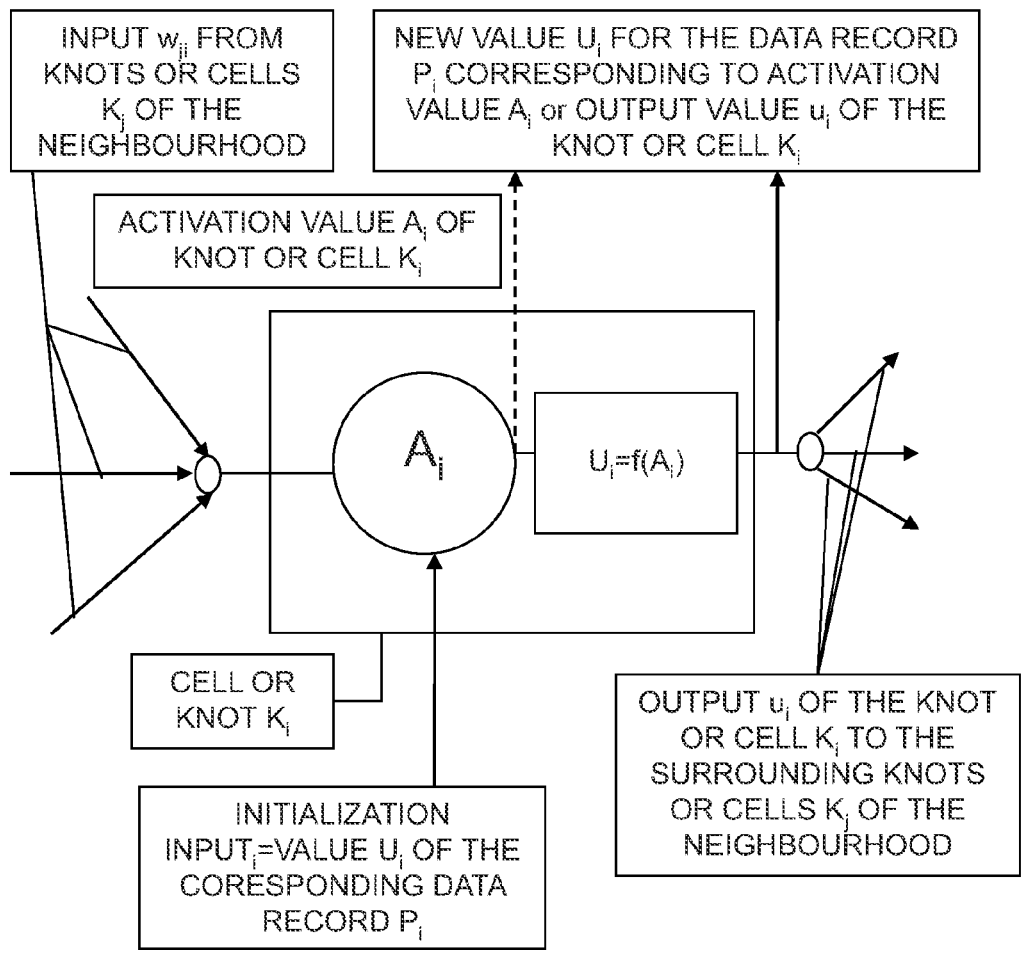

FIG. 13 is a schematic block diagram of a typical generalized cell or knot of the neural network according to the present invention.

Figures 1, 2:
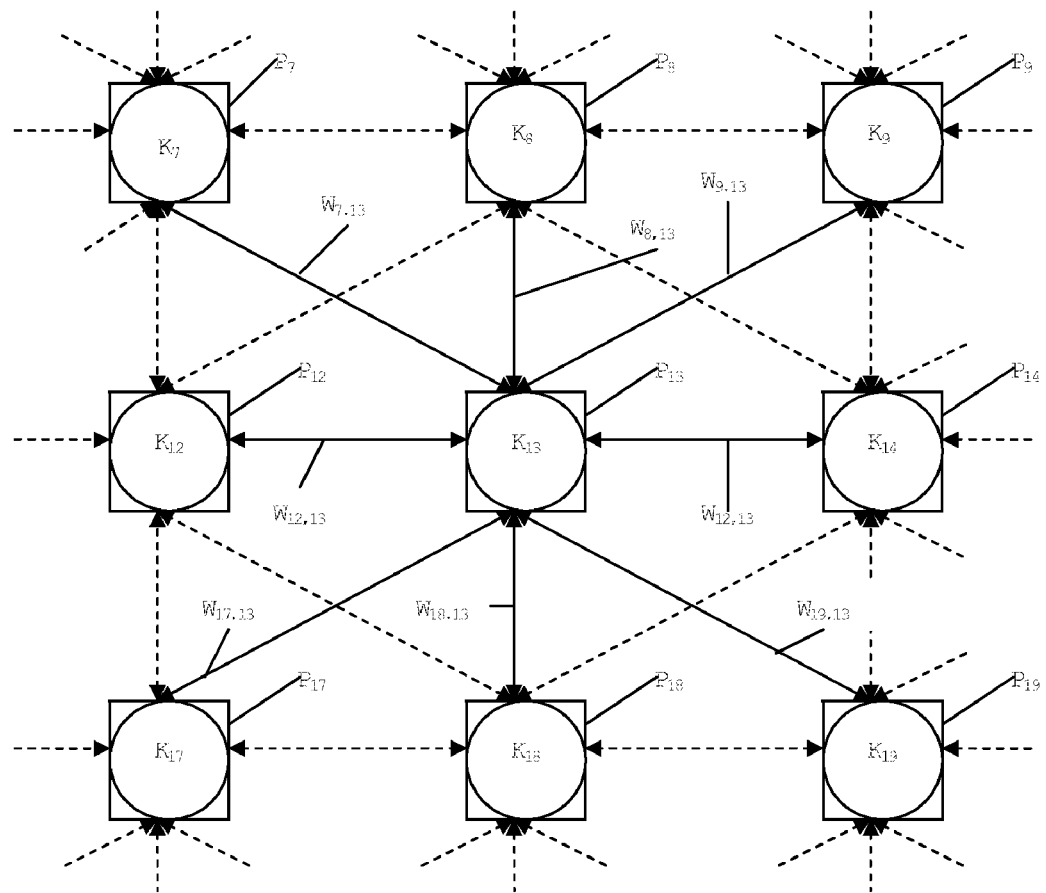
FIG. 1 is a schematic view of a two dimensional array of cells each one representing a data record in a two dimensional array of data, for example each cell representing schematically a point (a pixel) of a digital or digitalized image.
FIG. 2 represents the step of transforming the nine central points or cells of FIG. 1 in units or knots of an artificial neural network.

Referring now to FIG. 1, a two dimensional array of data records is schematized by an array of square cells which are identified by $P_i$, where i are elements of natural numbers. The central nine square cells $P_7$, $P_8$, $P_9$, $P_{12}$, $P_{13}$, $P_{14}$, and $P_{17}$, $P_{18}$, $P_{19}$, are drawn with continuous lines while the surrounding cells are drawn with discontinuous lines for representing the fact that the array can be larger than the one represented.

Each cell of the array is a cell for a data record which has its univocally related cell and so a univocally related position in the array, the relative position of each cell of data record to the other cells of data record being a relevant feature of the corresponding data record. Each data record of each cell has a value $U_i$, where i is an element of the natural numbers and where the value can be a parametric value of only a variable of the data record or a vector comprising each data record from a set of different variables. The above scheme is a representation of what is called in the specific technical language a database having a pertinent topology. This means that not only the values of the data records are relevant features of each data record, but also their relative position in a projection of the data record of the data base in a n-dimensional space or in an arrangement of the data records of the database in a n-dimensional matrix form, which is just a different formalism for indicating such a projection.

For example, in a digital or digitalized image is a two dimensional array of pixel, each pixel represents a data record in an array of data record and the relative position of the pixel is a relevant feature of each pixel belonging to the relevant information of the image data. The value of the pixel is a simple intensity value in a grey scale image, while in a colored image the value is a vector comprising at least two parameters or variables namely the color and the intensity, normally three parameter or variables in the actually used techniques of visualizing colored images as the so called HVS or the so called RGB coding of colored images.

FIG. 2 schematically picture the step used by the algorithm according to the present invention which provides for treating the data records of the two dimensional array by transforming the two dimensional array of cells in an array of cells or knots of an artificial neural network. The squares represents the relation to the original cells $P_i$ of FIG. 1, while the enclosed circle $K_i$ represents the transformation or association of each cell $P_i$ to a unit or knot $K_i$ of an array of cells or knots of an artificial neural network.

The connection arrows $w_{ij}$ represent the connections between the units or knots $K_i$ and $K_j$ of the artificial neural network. FIG. 2 is related only to the nine central cells of FIG. 1 and the connection arrows are continuous for the central cell $P_{13}$, which is the cell corresponding to the actual target data record, while the discontinuous arrows are related to connection to peripheral cells which are obviously used by the present algorithm and the mechanism of which derives identically from the description of the way of working of the present algorithm as described with reference to the sole central cell $P_{13}$. Also the fact that the arrows are provided at both ends of the connections represents the fact that by describing the way of working with reference of a peripheral cell to the center cell $P_{13}$, this actual center cell $P_{13}$ will become a peripheral cell of another cell which will be the center cell.

So by applying the algorithm according to the present invention to the array of cells the algorithm sweeps, the array cell by cell each time identifyies a cell as the momentary central cell and the corresponding peripheral cells and the associated connections between the central cell and the peripheral cells, and when the computation has been carried out for a certain cell momentary defined as a central cell, an adjacent cell is defined as the new central cell and new peripheral cells of this new central cells are identified with the corresponding connections, the computation being carried out this time for this new central cell and the new peripheral cells with the corresponding connections and so on. This mechanism is repeated until each cell of the array has been subjected to computation by the algorithm, thus ending a first computation cycle of the artificial neural network. The following cycles are identical with the difference that they are applied to the array of cells which has been previously treated by the algorithm.

FIG. 13 illustrates a schematic diagram of a cell or knot of the artificial neural network according to the present invention. Each knot or cell $K_i$ comprises inputs at which the output signals $u_j$ from other knots $K_j$ are received by the knot or cell $K_i$. Furthermore each knot or cell $K_i$ has an output $u_i$ which is connected to the input of one or more other knots or cells $K_j$. The output $u_i$ of each cell or knot is a function of an internal value $A_i$ or state of the knot $K_i$ also called activation value which can be also an identity function namely $A_i=u_i$.

In the present artificial neural network each knot or cell $K_i$ has also an input for an initialization value defining the initialization internal value or activation value $A_i$ of the knot or cell or the initialization output value $u_i$. In this case, referring to the example of FIGS. 1, 2 and 13, the initialization value for the internal value or activation value $A_i$ or the first output value $u_i$ of the knot $K_i$ is set equal to the value $U_i$ of the data record $P_i$ univocally associated as explained above to the knot $K_i$. Each knot or cell $K_i$ has further an output for the computed value $U_i^n$ for the data record $P_i$ after the n-th processing cycle of a sequence of a certain number m of processing cycles. The computed new value $U_i^n$ corresponds either to the internal value or activation value $A_i^n$ of the knot or cell $K_i$ after the n-th processing cycle has been carried out or to the output value $u_i^n$ of the knot or cell $K_i$ after the n-th processing cycle has been carried out.

As it appears from FIG. 2, the present artificial neural network comprises direct connections of a knot or cell $K_i$ only with the knots or cells $K_j$ directly adjacent to the knot or cell $K_i$. The set of this knots or cells $K_j$ are technically defined as the local neighborhood of the knot or cell $X_i$ or the knots or cells of gradient 1. The term gradient 1 refers to the stepwise difference between the position of the reference knot or cell $K_i$ and the position of the set of knots or cells $K_j$ forming the local neighborhood of the knot or cell $K_i$. This definition is intuitively understandable and is a widespread technical definition. So it is clear that in a discretized array where only discrete positions are possible for the elements of the array, defining a reference element the gradient 1 neighborhood is formed by the set of elements, which position differs from the position of the reference element by a step 1 in any direction of the array. This is the simplest case. The term gradient 1 is more generic since it is not limited to the spatial coordinates, but can be referred to any kind of space in which the an n-dimensional database is projected.

The connections between the knots $K_i$ and the knots of the local neighborhood $K_j$ are defined by their strength. The connection strength is quantitatively given by weights $w_{ij}$ or $w_{ji}$ which are multiplied with the output $u_j$ of the knots or cells $K_j$ of the local neighborhood of the knot $K_i$, when the signals of these knots of the local neighborhood are send to the reference knot $K_i$ connected to them. As explained in the introduction of the description, these weighted signals inputted to the reference knot $K_i$ will have an effect on its internal state $A_i$ in order to cause or inhibit the emission of an output signal $u_i$ or to change the value of said output signal $u_i$.

As already explained in the introduction such a neural network does not only consider as a basis for the processing the values of the knots or cells but also their relations and furthermore the interactions between the values of the knots or cells and their relations.

Two extremes has been generally discussed in the introduction, one of which considers the evolution of the internal value $A_i$ or of the output value $u_i$ of the knots or cells $K_i$ only as a function of the connections $w_{ji}$, by starting from their original or starting quantitative value $U_i$ which are the values of the data records $P_i$ univocally associated to a corresponding knot $K_i$. This initial or starting value $U_i$ has the only effect of an impulse of the process. One particular feature of this evolution consists in the fact that the process regulating the evolution of the connections $w_{ji}$ takes place in the space of the connections (equation (4b)). It is in this space that the solution is found for the evolution of the knots or cells. The starting values of the knots or cells $K_i$ act as simple constraint to the evolution of the connections $w_{ij}$. These connections $w_{ij}$ dynamically provide the values of the knots or cells and thus the attracting element of such a process will be the new definition of any knot or cells $K_i$ as an exclusively relational element, which is generated by the dynamic negotiation between its starting value $U_i$ and the starting value $U_j$ of the adjacent knots or cells $K_j$ of the local neighborhood.

The weights $w_{ji}$ which quantitatively define the connections are the function of the internal values of the knots $K_j$ of the local neighborhood and/or of the reference knot $K_i$.

In a second extreme case discussed form a general point of view in the introduction only the values of the knots or cells either as activation values $A_i$ and $A_j$ or in the form of output values $U_j$ and $u_j$ will evolve, while their connections as represented by the weights $w_{ji}$ remain unchanged and said connections will act as constraints of the evolution process.

Thus the way for determining the weights $w_{ji}$ and the values $u_j$ of the knots are given by set of equations called also rules.

Generally speaking, equations which defines the quantitative values of the weights are called learning rules, while equations which changes the internal state or the activation value or the output value of the knots as a function of the output values of the reference knot and of the adjacent knots of the knots of the local neighborhood are called activation rules.

So as already explained computation may be carried out by only considering a set of learning rules or functions which computes new outputs of the actual center cell $P_i$, by means of defining new weights $w_{ij}$ of the connections as a function of the outputs of the center cell and of the surrounding cells, this means of the values of the variable or of the variables of the data record corresponding to this cells. The new output of the center cell will be then set as the new value or the new values of the variable or of the variables of the center cell and will be a function of the outputs of the surrounding cells, this means of the values of the variable or of the variables of the data records corresponding to the surrounding cells and of the new weights computed by the algorithm.

During computation in a first cycle the weights $w_{ij}$ of the connections between the cells $P_i$ and $P_j$ used as knots $K_i$ and $K_j$ of the artificial neural network are set all equal to a certain value which can be randomly defined by a value for example 1 or 0.0001.

Basing on this weights the value of the actual central cell $P_i$, in the example of FIG. 2, the cell $P_{13}$ working as a unit or knot $K_{13}$ of an artificial neural network is changed as a function of the values of the surrounding cells $P_j$ which are also set equal to knots $K_j$ of the neural network (in FIG. 2 this are the cells and knots $P_7, P_8, P_9, P_{12}, P_{14}$, and $P_{17}, P_{18}, P_{19}$ and $K_7, K_8, K_9, K_{12}, K_{14}$, and $K_{17}, K_{18}, K_{19}$) and of the weights of the connections $w_{ij}$.

Another way of computing the new outputs of the units or knot $K_i$ is to use a set of activation functions or rules, which defines the output of the central knot $K_{13}$ as a function of the values $U_j$ (in FIG. 2, $U_7, U_8, U_9, U_{12}, U_{14}$, and $U_{17}, U_{18}, U_{19}$) of the data records of the cells $P_j$ (in FIG. 2, $P_7, P_8, P_9, P_{12}, P_{14}$, and $P_{17}, P_{18}, P_{19}$) surrounding the central cell $P_i$ (in FIG. 2, $P_{13}$) corresponding to the a unit or knot $K_i$ (in FIG. 2, $K_{13}$) to be activated and as a function of the weights $w_{ij}$. In this case new weights $w_{ij}$ are not computed.

There is also the possibility to apply a combined computation using a certain set of learning rules computing new weights $w_{ij}$ for the connection at each cycle and a certain set of activation rules computing new output values at each cycle.

Thus at the end of a cycle new outputs, this means new values of the variables for each data record of the array of data record, has been computed and also a new weight of the connections has be computed. Both which new values of the variable or of the variables of the data records and of the weights of the connections are used in the following computation cycle.

Relating to the example of FIG. 2, the function defines the net input of the knot $K_{13}$ by means of the outputs $U_7, U_8, U_9$, $U_{12}, U_{14}$, and $U_{17}, U_{18}, U_{19}$ of the surrounding knots $K_7, K_8, K_9, K_{12}, K_{14}$, and $K_{17}, K_{18}, K_{19}$ corresponding to the values of the associated cells $P_7, P_8, P_9, P_{12}, P_{14}$, and $P_{17}, P_{18}, P_{19}$ surrounding the central cell $P_{13}$ and the associated knot $K_{13}$. An additional function is provided, which based on the differences between the previous values of the outputs and the new values calculated by the algorithm, defines new weights $w_{ij}$ for the connections between the central knot $K_1=K_{13}$ in FIG. 2 and each one of the peripheral knots $K_j$ equal to respectively $K_7, K_8, K_9, K_{12}, K_{14}$, and $K_{17}, K_{18}, K_{19}$ in FIG. 2.

At the end of the first cycle when all the cells have been treated according to the above mentioned steps a new array of cells has been constructed, in which each data record has maintained its cell and where each data record has a new value for the variable or for the variables computed as described before in the first cycle while also new weights for the connections have been computed.

Thus a second cycle can be carried out by using this new array of data records this time using the values of the data records computed in the first or previous cycle as outputs of the knots of the artificial neural network corresponding to the cells, and where the new weights for the connection between the knots corresponding to the cells are used, which have been computed in the first or previous cycle as described before. In the second or following cycle again new outputs of the knots and thus new values of the data records are computed thus forming again a new array of data records in which the data records have updated values. Similarly corresponding new weights for the connections between knots are computed to be used in a following cycle of the algorithm if this is provided or necessary.

The number (n) of following cycles can be determined as a fixed parameter. Alternatively the number of repetitions can be determined by an error or deviance calculation of the values of the new array of data records related to the original one by setting a maximum error or deviance. This calculation can be carried out by means of usual error or deviance calculation in the field of the artificial neural networks.

Another criterion might consist in the fact that the difference of the sequence of new values for the variables of the data records is monitored and the repetition of the algorithm is stopped when the differences of the values in the sequence of cycles is not anymore significant, this mean that it is less than a predetermined value. This means also that the new values do not differ substantially from the previous one. The meaning of substantial difference has to be related to the value of the variables of the data records and to the kind of data records since in some cases very small differences might have great influence on the information of the data record while in other cases do not.

In the following description, some examples of rules for updating the output of the knots of the artificial neural network and thus the values of the corresponding data records and for updating the weights of the connections are given. These rules, which are functions, are defined by a name which will help in simplifying the identification in the description of a particular rule.

In particular the different kind of revealed or enhanced information depends on the different set of learning and or activation rules applied to the neural network structure formed by the pixel array of the original image. Principally the effect obtained is similar to the one which can be obtained by using enhancing media such as contrast media in the echographic, radiographic, nuclear magnetic resonance imaging or in similar imaging methods.

The kind of information that is enhanced can furthermore be differentiated by the choice of a certain set of learning and/o activation rules. In general it is possible to recognize two families of this set of rules. The two families are summarized in the table of FIG. 3 in which the different sets of rules are identified by a name explained later on.

A first family comprises rules which principally carry out a weight optimization which can further be combined with unit activation. This kind of rules helps in finding out edges between different zones of an image for recognizing boundaries, for example boundaries between different kind of tissues in images of biological bodies.

A general kind of set of rules is defined as Automata Rule (A or AR) and comprises functions for determining optimized weights, so called learning rules. The following two set of rules can be used:

$$k = \frac{\sigma}{2^N}$$

$$R_{ij} = e^{-(k \cdot u_i - k \cdot u_j)^2} \quad u \in [0, 2^N]$$

$$R'_{ij} = \left(R_{ij} - \frac{1-\varepsilon}{2}\right) \cdot C \quad C = 5; \varepsilon = e^{-\frac{\sigma^2}{4}};$$

$$w_{ij} = \frac{e^{R'_{ij}} - e^{-R'_{ij}}}{e^{R'_{ij}} + e^{-R'_{ij}}}$$

where

σ is a parameter which can freely defined by the user and which renders the algorithm sensible to differences in the image, $R_{ij}$ is a measure for the distance of the i-th unit from the j-th unit, $u_i$ are the values of the single cells $P_i$ transformed in knots $K_i$ of the artificial neural network, and where the suffix i defines the central cell or knot and the suffix j defines the cells or knots directly surrounding the central cell or knot.

Figure 3:
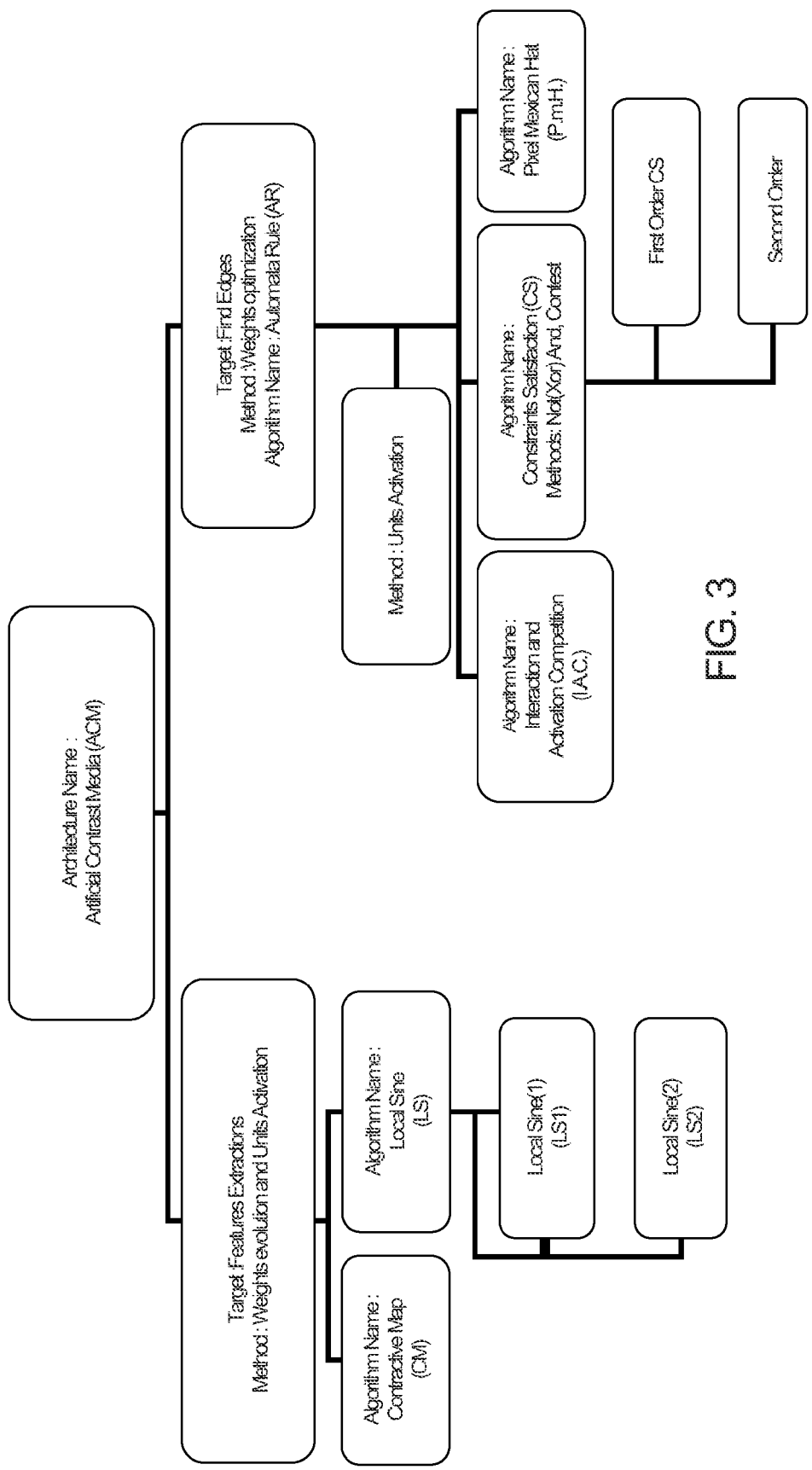
FIG. 3 illustrates a diagram of the different families of learning and activation rules for the neural network, particularly referring to a neural network structure formed by the pixel of a digital image.

According to the diagram of FIG. 3, this general rule may be further specialized or enhanced obtaining different set of rules.

The above disclosed automata rule defines the connection strength between each target or reference knot or cell $K_i$ with each one of the knots or cells $K_j$ of the local neighborhood as the non linear projection of their different value $u_i$ and $u_j$. Each reference knot or cell $K_i$ is thus connected with eight symmetric weights $w_{ji}$ to the knots or cells $K_j$ of the local neighborhood of gradient 1. Every bidimensional database such as a bidimensional image will so be formed by a matrix in which each element of the matrix is connected as an autonomous unit to the eight elements of its local neighborhood, i.e. to the matrix elements directly adjacent to the reference one. Each bidimensional matrix array of data such as an image will be further formed by a specific number of symmetric connections between each element of the matrix and the elements of the local neighborhood.

The quantitative strength value of the connections $w_{ji}$ which are defined by the above mentioned equations forms the constraints by means of which the data carry such as an image, and the fact of being in the form of an active matrix of the connection strength will cause the evolution in time of the initialization value of each cell or knot till to the predetermined n-th processing cycle and towards the natural attractor.

A set of rule II is generally indicated as CS, i.e. Constraint Satisfaction, which can be developed in different variants disclosed hereinafter:

II.1. So Called CS $\overline{XOR}$

| Center | Neighbors | State |
|--------|-----------|-------|
| 1 | 1 | 1 |
| 1 | 0 | 0 |
| 0 | 1 | 0 |
| 0 | 0 | 1 |

Initialization: $u_i = input_i$ $$Net_i = \left(\sum_j u_j w_{ij}\right) \cdot \alpha$$

$$\Delta_i = Net_i \cdot (1 - u_i) \cdot \alpha \quad Net_i > 0$$
$$\Delta_i = Net_i \cdot u_i \cdot \alpha \quad Net_i < 0$$
$$u_i^{[n+1]} = u_i^{[n]} + \Delta_i$$

where $u_i$ is the output of the central knot $K_i$ $u_i$ is also defined as input of the i-th knot or cell in combination with the initialization step. This definition wants to stress out that at the first step of carrying out the neural network the i-th unit has as an output value the value of the corresponding pixel in the digitalized source image. Obviously, in the starting step of the neural network, this value has to be attributed to the i-th knot or cell and is considered as an input. In the following computational cycles the value of each knot or cell is changed by the algorithm and when a certain number of repetitions has been carried out, the value of the i-th knot or cell corresponds or is correlated to the value of the i-th pixel in the output image, $u_j$ are the outputs of the surrounding knots $K_j$, $Net_i$ is the net input of the central Knot $K_i$ computed as a function of the outputs $u_j$ of the surrounding knots $K_j$ and the weights $w_{ij}$ of the connections of the surrounding knots $K_j$ to the central Knot $K_i$.

n is the number of cycles, $\Delta_i$ is the update value of the output $u_i$ of the central knot $K_i$ for computing the new output value for the next cycle as a function of Net input $Net_i$ and the actual output $u_i$ of the central knot $K_i$, α is a constant.

II.2 So Called CS AND

| Center | Neighbors | State |
|--------|-----------|-------|
| 1 | 1 | 1 |
| 1 | 0 | 0 |
| 0 | 1 | 0 |
| 0 | 0 | 0 |

Initialization: $u_i = input_i$ $$Net_i = \left(\sum_j u_j w_{ij}\right) \cdot \alpha$$

$$\Delta_i = Net_i \cdot (1 - u_i) \cdot \alpha \cdot \left(\sigma^2 - \frac{1}{2}\right) \quad Net_i > 0$$

$$\Delta_i = Net_i \cdot u_i \cdot \alpha \cdot \left(\sigma^2 - \frac{1}{2}\right) \quad Net_i < 0$$

-continued $$u_i^{[n+1]} = u_i^{[n]} + \Delta_i$$

$$\bar{u} = \frac{\sum_{k \neq i}^{N} u_k}{N}; \sigma^2 = \frac{\sum_{k \neq i}^{N} (\bar{u} - u_k)^2}{N}$$

In this case same definitions apply as in the previous case. The difference between this activation function and the previous one lies in the fact that the function for computing $\Delta_i$ comprises a further term defined as $\sigma^2$ and this term is defined above as a function of the mean of the outputs of all knots except the central knot $K_i$ which is activated.

II.3 So Called CS CONTEST

| Center | Neighbors | State |
|--------|-----------|-------|
| 1 | 1 | 1 |
| 1 | 0 | 0 |
| 0 | 1 | 1 |
| 0 | 0 | 0 |

Initialization: $u_i = input_i$ $$Net_i = \left(\sum_j u_j w_{ij}\right) \cdot \alpha$$

$$\Delta_i = Net_i \cdot (1 - u_i) \cdot \alpha \cdot \left(\sigma^2 - \frac{1}{2}\right) \; Net_i > 0$$

$$\Delta_i = Net_i \cdot u_i \cdot \alpha \cdot \left(\frac{1}{2} - \sigma^2\right) \; Net_i < 0$$

$$u_i^{[n+1]} = u_i^{[n]} + \Delta_i$$

$$\bar{u} = \frac{\sum_{k \neq i}^{N} u_k}{N}; \sigma^2 = \frac{\sum_{k \neq i}^{N} (\bar{u} - u_k)^2}{N}$$

Also here apply the same definitions as in the previous examples of activation functions (1) and (2).

The difference lie in the fact that the term $\Delta_i$ is computed in a different way for the case $Net_i < 0$.

II.4 So Called HIGH CS $\overline{XOR}$

Initialization $u_i = input_i$ $$Net_i = \left(\sum_j u_j w_{ij} \cdot \sigma^2(w_{jk})\right) \cdot \alpha \; k \in [1, N]; k \neq j$$

$$\Delta_i = Net_i \cdot (1 - u_i) \cdot \alpha \; Net_i > 0$$

$$\Delta_i = Net_i \cdot u_i \cdot \alpha \; Net_i < 0$$

$$u_i^{[n+1]} = u_i^{[n]} + \Delta_i$$

$$\overline{w_j} = \frac{\sum_{k \neq j}^{N} w_{j,k}}{N}; \sigma^2(w_{ik}) = \frac{\sum_{k \neq j}^{N} (\overline{w_j} - w_{jk})^2}{N}$$

Again the symbols are defined as in the previous examples of activation functions In this case the function for computing the net input $Net_i$ to the knot $K_i$ is different as in the previous cases. The function $\sigma^2$ is used in the computation of the net input. In this case the function $\sigma^2$ is applied to the weights $w_{ij}$ of the connections as it appears clearly from the above equations.

The functions for computing the update at value of the output $U_i$ of the central knot $K_i$ are identical to the case of the first example of activation function II.5 So Called HIGH CS AND Initialization $u_i = input_i$ $$Net_i = \left(\sum_j u_j w_{ij} \cdot \sigma^2(w_{jk})\right) \cdot \alpha \; k \in [1, N]; k \neq j$$

$$\Delta_i = Net_i \cdot (1 - u_i) \cdot \alpha \cdot \left(\sigma^2 - \frac{1}{2}\right) \; Net_i > 0$$

$$\Delta_i = Net_i \cdot u_i \cdot \alpha \cdot \left(\sigma^2 - \frac{1}{2}\right) \; Net_i < 0$$

$$u_i^{[n+1]} = u_i^{[n]} + \Delta_i$$

$$\overline{w_j} = \frac{\sum_{k \neq j}^{N} w_{j,k}}{N}; \sigma^2(w_{ik}) = \frac{\sum_{k \neq j}^{N} (\overline{w_j} - w_{jk})^2}{N}$$

$$\bar{u} = \frac{\sum_{k \neq i}^{N} u_k}{N}; \sigma^2 = \frac{\sum_{k \neq i}^{N} (\bar{u} - u_k)^2}{N}$$

As it will appear clearly from the comparison of this set of equations with the example of activation function (4) called High CS XOR and activation functions (2) called CS AND, this is a combination of the two set of activation functions.

II.6 So Called HIGH CS CONTEST

Initialization $u_i = input_i$ $$Net_i = \left(\sum_j u_j w_{ij} \cdot \sigma^2(w_{jk})\right) \cdot \alpha \; k \in [1, N]; k \neq j$$

$$\Delta_i = Net_i \cdot (1 - u_i) \cdot \alpha \cdot \left(\sigma^2 - \frac{1}{2}\right) \; Net_i > 0$$

$$\Delta_i = Net_i \cdot u_i \cdot \alpha \cdot \left(\frac{1}{2} - \sigma^2\right) \; Net_i < 0$$

$$u_i^{[n+1]} = u_i^{[n]} + \Delta_i$$

$$\overline{w_j} = \frac{\sum_{k \neq j}^{N} w_{j,k}}{N}; \sigma^2(w_{ik}) = \frac{\sum_{k \neq j}^{N} (\overline{w_j} - w_{jk})^2}{N}$$

$$\bar{u} = \frac{\sum_{k \neq i}^{N} u_k}{N}; \sigma^2 = \frac{\sum_{k \neq i}^{N} (\bar{u} - u_k)^2}{N}$$

Also this case represents a combination of two of the previous examples of activation functions, namely the activation functions (3) called CS CONTEST and the activation functions (4) called High CS XOR.

The above disclosed different variation of set of rules follow a common general concept. The basic idea as explained by means of the example of a two dimensional image consist in considering each pixel of the matrix as a hypothesis which can be gradually true or false in relation to the luminosity of each pixel. Also this system inherits the local connections between each pixel and its local neighborhood the strength of the connection being expressed by means of the weights as computed by the above disclosed automata rule. This connections work as constraints during the evolution of the active matrix of the connections. The function of cost of the above disclosed system of equation consist in attempting to make true each hypothesis of the matrix and thus to bring luminosity of each pixel to a maximum. During this process the weights defining the connection which has been previously computed will act as constraints.

As an example above there is shown the behavior of the pixels in some border-line cases:

| Value of the reference pixel | Value of the neighbour pixel | connections | Evolutions |
|---|---|---|---|
| high | high | (+) | Rapid increase |
| high | low | (−) | Slow decrease |
| Low | high | (−) | Rapid decrease |
| Low | Low | (+) | Slow increase |

A further special set of rules differing from the CS set of rules is the set of rules III identified by the name IAC, i.e. Interaction and Activation Competition:

IAC $$MaxPixelRange = 2^M; u_i \in [0, 1]; \alpha = \beta = \frac{Sigma}{2^M}; N = Intorno;$$

Max = 1; Min = 0; rest = 0.1; decay = 0.1;

$$ecc_i = \sum_j^N u_j \cdot w_{ij}; w_{ij} > 0$$

$$ini_i = \sum_j^N u_j \cdot w_{ij}; w_{ij} < 0$$

$$Net_i = (ecc_i \cdot \alpha) + (ini_i \cdot \beta)$$

$$Act_i = \frac{e^{Net_i} - e^{-Net_i}}{e^{Net_i} + e^{-Net_i}}$$

$$\Delta_i = (Max - u_i) \cdot Act_i - decay \cdot (u_i - rest); Act_i > 0$$

$$\Delta_i = (u_i - Min) \cdot Act_i - decay \cdot (u_i - rest); Act_i < 0$$

$$u_i^{[n+1]} = u_i^{[n]} + \frac{e^{\Delta_i} - e^{-\Delta_i}}{e^{\Delta_i} + e^{-\Delta_i}}$$

Here the net input $Net_i$ of the central knot $K_i$ is defined as a combination, more precisely as a sum of two different functions for computing the net input depending on the fact of whether the weights $w_{ij}$ of the connections are positive or negative. More precisely the functions $ecc_i$ and $in_i$ are identical only a selection is made between inputs associated to positive and to negative weight connections. This is expressed by the two functions $ecc_i$ and $ini_i$. These two components of $Net_i$ are related to an excitation or enhancement in the case of the component $ecc_i$ and to an inhibition in the case of $ini_i$. The net input $Net_i$ is a combination of the $ecc_i$ and $ini_i$ in which $ecc_i$ and $ini_i$ are multiplied respectively by a parameter $\alpha$ and by a parameter $\beta$. The two parameters determine the influence of the positive weight connections and of the negative weight connections on the net input $Net_i$.

Furthermore, an activation parameter $Act_i$ is provided as a function of the net input $Net_i$ to the knot $K_i$.

This parameter is used for choosing one of two different function for computing the update value $\alpha_i$ of the output $U_i$ of the knot $K_i$ depending on whether $Act_i$ is negative or positive. The enhancing and inhibiting clearly appears also from the two functions for computing $\alpha_i$ since $Act_i$ is present as a parameter in said functions.

The functions further comprise the following expressions:

Max and Min which are defined as the top and the bottom range of the activation value, Decay which is a function defined as the usual decay value along the time of each unit, Rest which is defined as the default value toward which each unit tends.

The new output value of the knot $K_i$ is defined by a particular exponential function which further enhances the excitation and inhibition mechanism of this example of activation functions.

Generally speaking as referred to an example of an image formed by an array of pixels as the database to be processed, the above equations define an active matrix of the connections in which every pixel is an agent which receives dynamically excitation and inhibition impulses from the other pixels and which modifies correspondingly its internal state. The above equation system can be defined as a collective auto-coordinating system between agent-pixels. The pixels having a high luminosity tend to support themselves, while the other pixels are drawn towards low values of luminosity. The fixed connection weights between each agent-pixel and its local neighborhood act as constraints which modulate the communication between each pixel. The communication is formed by exciting and inhibiting messages. The evolution causes by discrete steps transformation of the original image to leave isolated the pixel which are in a situation of a sudden change of luminosity and to be drawn to low values of luminosity. Thus, the entire system will highlight the edges which are present in an image without using a function which is explicitly designed for this task. Where the pixel are in competition with each other some sort of walls are visualized, which we often perceive as walls between different figures. The advantage of the above system of rules lies in the fact that the edge detection effect takes place due to a local auto-coordination. Furthermore also a function as an adaptive threshold filter occurs. For each edge a line is represented having a thickness which corresponds to the difference in local luminosity, which the image shows in every area.

A further alternative of the above mentioned sets of rules is the set IV so called Pixel Mexican Hat PmH $$MaxPixelRange = 2^M; u_i \in [0, 1]; N = Surroundings$$

Max = 1; Min = 0; rest = 0.1; decay = 0.1;

$$ecc_i = \sum_j^N (u_i - u_j \cdot w_{ij})^2; w_{ij} > 0$$

$$ini_i = \sum_j^N (u_i - u_j \cdot w_{ij})^2; w_{ij} < 0$$

$$Net_i = \left(\left(1 - \frac{ecc_i}{1 + ini_i}\right) \cdot e^{-\frac{ecc_i}{1+ini_i}}\right) - \left(\left(1 - \frac{ini_i}{1 + ecc_i}\right) \cdot e^{-\frac{ini_i}{1+ecc_i}}\right)$$

$$Act_i = \frac{e^{Net_i} - e^{-Net_i}}{e^{Net_i} + e^{-Net_i}}$$

-continued $$\Delta_i = (\text{Max} - u_i) \cdot Act_i - \text{decay} \cdot (u_i - \text{rest}); Act_i > 0$$

$$\Delta_i = (u_i - \text{Min}) \cdot Act_i - \text{decay} \cdot (u_i - \text{rest}); Act_i < 0$$

$$u_i^{[n+1]} = u_i^{[n]} + \frac{e^{\Delta_i} - e^{-\Delta_i}}{e^{\Delta_i} + e^{-\Delta_i}}$$

Here the same definitions apply as to the previous set III called IAC.

It is important to note that the more specialized sets II.1 to II.6, III, and IV differ from the general one called AR by the fact that not only a weight optimization is carried out but also a units activation.

This system of rules act as a magnifying lens having a local and adaptive threshold. The effect referred to an image is that all the pixels are highlighted which are in a minimal conflict relating to luminosity but which have a regular and pertinent luminosity, so that the visual effect is to illuminate the edges which often are not visible with the eyes.

A second family of rules provides for weight evolution and unit activation and allow to carry out an extraction of features from a source digital or digitalized image such as for example a kind of tissue in an image of biological bodies or structures of tissues or objects, like, for example, recognizing the presence of stenosis in angiographic images.

Two sub groups of sets of learning and activation rules are provided.

A first one indicated as the set V so called CM, Contractive map can be defined as a recirculation neural network and comprises a learning phase and a recall phase (for more in depth information, see Massimo Buscema & Semeion Group: "Reti Neurali Artificiali e Sistemi Sociali Complessi" Volume I, Edizione Franco Angeli Milano 1999).

The set of rules V so called CM comprises the following functions:

a) Learning $$u \in [0, 1]; C = \text{neighbors}; w_{ij} = 0.0001 \text{ Initialization}$$

$$\Delta w_{ij} = u_i - (u_j \cdot w_{ij}) \cdot \left(1 - \frac{w_{ij}}{C}\right) \cdot u_j$$

$$w_{ij}^{[n+1]} = w_{ij}^{[n]} + \Delta w_{ij}$$

$$Out_i(\text{rem}, quot) = \text{mod}\left(\frac{\sum_{k \neq i}^{N} w_{i,k}}{N} \cdot MaxPixel, MaxPixel\right)$$

b) Recall $$\text{New} W_{ji} = \text{New} W_{ij} = w_{ij} - \overline{w}$$

where

N is the local neighborhood, $u_i$ is the value of the central cell or knot $K_i$, $u_j$ are the values of the surrounding knots $K_j$, $w_{ij}$ indicates the weights of the connection of the surrounding knots $K_j$ and the central knot $K_i$.

$Wu_{ij}$ defines the weights of the connection in the n-th cycle, $w_{ij}$ defines the weight of the connections in the n+1-th cycle, $\Delta w_{ij}$ is the value which has to be added to the weights $w_{ij}$ in order to update then for the next cycle, $Out_i$ is the output value of the i-th unit corresponding to the i-th pixel which is the target unit or pixel, New $W_{ji}$ is the new weight of the connection between j-th and i-th unit, New $W_{ij}$ is the new weight of the connection between i-th and j-th unit $\overline{w}$ is the mean value of the weight.

The arguments rem and quot relates to a particular function applied to the value of each pixel, this means to the output of each unit $u_i$.

Considering only a grey scale image, the value of each pixel and thus the output of each corresponding unit can be divided by the number of grey scale levels.

If one considers for example 256 grey scale levels, than the value of each pixel can be divided by this number. By considering only solutions of the division belonging to the integer numbers, this division gives rise to a certain reduced number of classes to which the pixels, i.e. the units belong and furthermore to a rest. The rest is indicated by the variable rem.

This kind of operation provides for a classification of the units and thus the pixels in a certain reduced number of classes and to visualize each class in the output image by giving to the class a certain uniform color or grey level. The rest, this means the rem value, is further used to differentiate the intensity of the color or grey level. For example, considering four classes for the pixel or units each class can be given a color such as red, green, blue, yellow or four grey levels. The rest of each pixel can be used for varying each color between dark red or light or pale red and so on. These allow further differentiation the pixels of the output image which belong to the same class.

It is possible to compare the rem function as a function for modulating the values given to unit output and so to the pixels of the output image within certain value range characterizing each class defined by the quot function.

Obviously the quot and rem function apply also to pixels values corresponding to colored pixels, where normally the pixel value is a vector providing three parameters as for example RGB definition of colored pixel values or HSV, or the like.

As it might appear evident from the above listed equations, the pixels value and correspondingly the output value of the units of the image transformed in a neural network are normalized at the beginning for maintaining the possible output values within an interval between 0 and 1.

During definition of the classification by means of the quot function and the corresponding rem function, the output values are again denormalized, i.e. rescaled from the interval between 0 and 1 to the original interval.

Not using the classification of the functions quot and the modulation of the function rem and not denormalizing the output values of the units of the neural network, this means the pixel values, particularly the pixel values of the output image, and by defining a scale of grays or of colors which scale is correlated to the values of the units of the neural network or the above mentioned pixel values of the output image, it is possible to obtain a modified rule which is defined as "CM true color", while the other rules are defined as "CM quot", when only the classification with the quot function is applied or "CM quot+rem" when also the rem function is applied in combination with the quot function.

Referred to the example of the image made of an array of pixels, the basic idea of the above disclosed set of rule is that processing starts from the initialization value of each pixel: the value will be left invariant through the cycles. Indeed the evolution takes place on the weight defining the connections and at each processing cycle each pixel takes its new value of brightness as a function of said weights, which characterize the pixel at the current instant. Here connections between the reference pixel and the pixel of its local neighborhood are bidirectional. Each pixel has a connection with which it communicates with another pixel and a second connection for receiving communications form this last pixel.

The evolution law or rule of the weights defining the connections is in this set of rules of the deterministic type and the weights are initialized with values which are proximate to zero.

The new values of brightness for each pixel in every process cycle are defined in the space of the weights. Thus each value of each pixel is defined by the weights defining the connection of this pixel with the pixels of the local neighborhood.

A further different set of rules, which is the set VI and is defined as Local Sine LS, belongs also to the above mentioned second family of set of rules.

The local sine set can be provided according to two variants called Local Sine 1 LS1 and Local Sine 2 LS2 These two sets differs only in one equation and the set of rules is described by the following equations:

$$k = \frac{\sigma}{2^M};$$

$$w_{ij} = \pi;$$

$$Net_i = \left[\sum_j^N \sin(u_j \cdot w_{ij})\right] \cdot k; \; u_j \in [0, 1];$$

$$d_{ij} = (u_i - u_j \cdot w_{ij})^2;$$

$$\Delta_{ij} = d_{ij} \cdot Net_i \cdot \cos(u_j \cdot w_{ij}) \cdot u_j; \quad \text{(LS1)}$$

$$\Delta_{ij} = d_{ij} \cdot Net_i \cdot \cos(u_j \cdot w_{ij}) \cdot -\sin(u_j \cdot w_{ij}); \quad \text{(LS2)}$$

$$w_{ij}^{[t+1]} = w_{ij}^{[t]} + \Delta_{ij};$$

$$\overline{w_i} = \frac{\sum_j^N w_{ij}}{N};$$

$$W_{Max} = \text{Max}\{w_{ij}\}; \; W_{Min} = \text{Min}\{w_{ij}\};$$

$$\text{Scale} = \frac{2^M}{W_{Max} - W_{Min}}; \; \text{Offset} = \frac{W_{Min} \cdot 2^M}{W_{Max} - W_{Min}};$$

$$Out_i = \text{Scale} \cdot \overline{w_i} + \text{Offset};$$

Most of the variables or functions of the above equations have already been defined in the disclosure of the previous set of rules I to V.

$d_{ij}$ represents some sort of distance of the i-th unit form the j-th unit,

σ is the standard variation.

As already disclosed, it is possible to use only a set of learning rules, only a set of activation rules or both a set of learning rules and of activation rules for applying the algorithm to the array of data records.

As it will appear clearly form the following examples illustrated also in the figures, different kinds of sets of learning rules or of activation rules or of combinations thereof will lead to different outputs which will enhance particular relationships between the data records of the array with respect to other relation ships.

It is important to notice that the present algorithm does not consist in a non supervised mapping algorithm but transforms an array of data records in an active artificial neural network capable of working in a supervised or non supervised manner depending on the rules or functions for learning and activating. In any case a learning phase is present, which normally does not occur in non supervised mapping algorithm.

Any kind of known or future artificial neural network may be applied for actuating the principle of the algorithm according to the present invention, which is independent from the structure of the artificial neural network itself.

Furthermore, it is possible to subject an array of data records to a first learning phase according to a certain known set of learning rules and then a first time to a first set of activation functions. The result so obtained is obviously again an array of data records which may be subjected once again to computation with the algorithm according to the present invention, this time choosing equal or different learning rules and a different set of activation functions. In this way an elaboration of the original array of data records is carried out by means of a sequence of two algorithms according to the present invention, which are different relating to the learning rules and/or to the sets of activation functions.

The different sets of rules applied in the first computation cycle and in a second computation cycle does not belong necessary to only one family of set of rules, but the set of learning and activation rules of both families may be combined in as two, three or more stage algorithm for elaborating digital or digitalized images.

The effectiveness of the algorithm according to the invention will be shown by means of some practical examples. In these examples the array of data records is formed by image date of a digital image or a digitalize image. Each cell or point $P_i$ of the schematic example of FIGS. 1 and 2 is formed by a pixel of the image and the value of each cell of point $P_i$ is formed by the intensity parameter, i.e. by the parameter influencing the level of grey of the pixel.

It must be noticed that the examples could be also carried out for colored image in this case the value of each pixel would have be defined by a set of parameter in the form of a vector defining the intensity and the color.

FIG. 4A illustrate a mammography taken according to traditional techniques. FIG. 4B is an enlargement of FIG. 4A. The traditional image of analogical type was digitalized with a scanner and treated with the algorithm according to the present invention.

FIG. 4C illustrates the image resulting from the treatment of the mammography of FIG. 4B, where the algorithm was applied using only the set of learning rules and activation rules defined above as CM. As it appears clearly from FIG. 4C, the rule CM has the effect of enhancing contrast and putting into evidence image zones having equal intensity or level of grey scale by defining clear boredom lines. Equal intensities or grey scale level are defined within a certain range of intensities or grey scale level in a discretized scale of intensities or grey levels.

As it appears clearly from the comparison of FIGS. 4B and 4C, the modulus or the zone of higher vascularization in FIG. 4B is highlighted by the treatment with the algorithm according to the invention and the boredoms of these zones are sharply depicted in FIG. 4C. FIGS. 5A to 5D are enlargement of this zone of the nodule to better evidence the clear boredom of the image zones furnished by the treatment of traditional mammography with the algorithm according to the present invention. It is also to be noticed that the image resulting from the treatment with the algorithm according to the present invention is able to extract also more information from the analogical mammography. Indeed the edges of the breast in the analogical image are not clearly differentiated from the background of the image. As it appears from FIG. 4C, the algorithm according to the invention is able to set a more defined boredom clearly differentiating the background from the image of the breast. This is important in order to make measurement of the position of the nodule if an intervention has to be carried out, particularly a reduced invasive intervention by means of microsurgical techniques.

The use only of the set of functions defined above as CM for applying the algorithm according to the present invention to the analogical image somehow inverts the black and white zones of the image for certain zones and, being set for enhancing contrast, gives some sort of very discretized image defining sharply differentiated image zones.

Figure 5B:
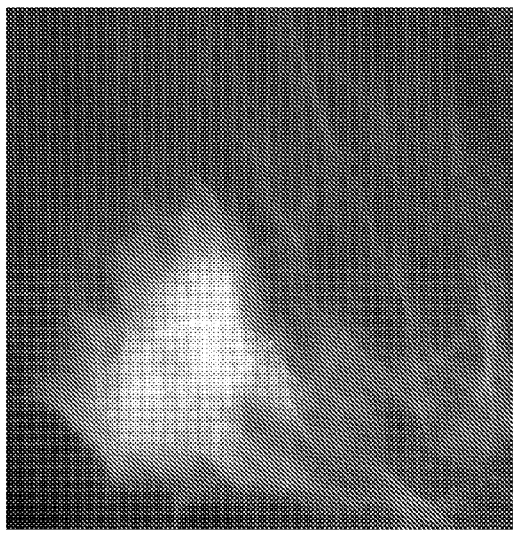
Figure 5A:
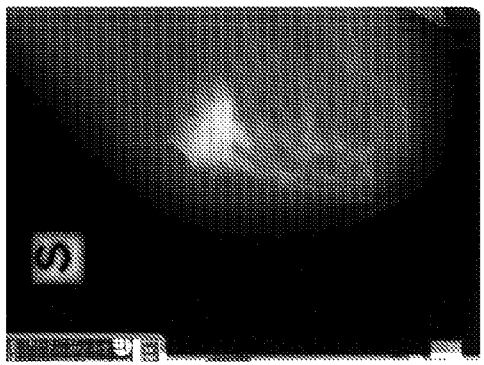
Figure 5D:
Figure 5C:
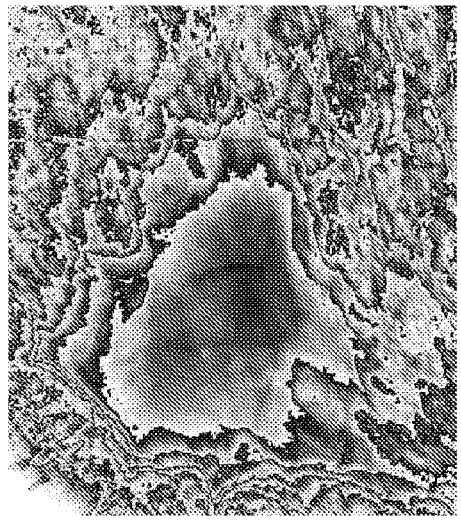

FIG. 4D and the corresponding enlargement of FIG. 5D illustrate the image obtained by a double treatment of the analogical image of FIGS. 4C and 5C with the algorithm according to the present invention.

In this case the first treatment is carried out by applying the algorithm using only the set of functions which has been defined above as CM. The image data, this means the array of image data obtained by this treatment, is further subjected to a treatment with the algorithm according to the present invention where use is made of a combination of learning and activation functions, and more precisely of the set defined above as Automata Rules AR and of the set of functions defined above as IAC.

At first it is to be noticed that an inversion of black and white zones has been obtained with respect to the image of FIGS. 4C and 5C and partially with respect of the images of FIGS. 4B and 5B. Particularly, the background is white instead of black. Furthermore, the nodule is white as in the original analogical image of the mammography (FIGS. 4B and 5B). A more miniaturized discretization of the image is obtained and also the internal structure of the nodule, which in the image of FIGS. 4C and 5C was not subjected to a differentiation in relation to the appearance of this structure in the original mammography except for the inversion of black and white, is subjected to a differentiation and the more important structures are highlighted.

FIG. 6A illustrates an analogical image of bacteria. The image has been taken with an electronic microscope. The FIGS. 6B to 6F illustrate the images resulting from the treatment of the image of FIG. 6A with different known image pattern recognition algorithms. FIG. 6G illustrates the image resulting from the treatment of image of FIG. 6A by means of the algorithm according to the present invention, which is applied using only the set of rules named AR and the evolutionary rule named IAC as defined above.

The difference and superiority of the image obtained by the algorithm according to the present invention appears clearly and without doubts form the comparison of the image according to FIG. 6G with the images according to FIGS. 6B to 6F. Again it is important to note how the particular set of applied learning rules enhances the contrasts and sets clear boredom of the different image zones.

The same effect can be observed in relation to FIGS. 7A to 7C. Here FIG. 7A is a digital image of the ventricle of the heart. FIG. 7B illustrates the image treated by a known image recognition algorithm called Snake. FIG. 7C illustrates the image obtained by treatment of image of FIG. 7A with the algorithm according to the present invention using only the set of functions defined above as CM. Clear and well defined boredoms of the image zones are obtained and the different areas are well differentiated in the image.

The about resulting capability of the algorithm according to the present invention of evidencing contrasts and setting clear boredom to different image zones and differentiating the image zones has a surprising effect. This effect can be appreciated by comparing the images of FIGS. 8A to 8E.

FIGS. 8A to 8D illustrate ecographic images of metastases taken at different instants in relation to the instant of injection of so called contrast media, i.e. of substances capable of enhancing the revelation of vascular activity by reflecting the ultrasound beam in a non linear way, namely at a frequency different from the fundamental frequency of the impinging beam, normally at a frequency of the order of the second harmonics of the fundamental frequency of the impinging beam.

FIG. 8A is an image taken at an instant before the contrast media are present in the imaged zone.

FIG. 8B is an image taken during the arterial phase where the contrast medium has reached the imaged zone.

FIG. 8C is an image of the same zone of FIGS. 8A and 8B taken at an instant where the arterial and venal phase are at a balance.

FIG. 8D is an image taken at a late instant relating to the injection of the contrast medium.

In FIG. 8D a white circle illustrates the metastasis, which appears as a darker spot relating to the surrounding image.

FIG. 8E is the image resulting from the treatment of image 8A, i.e. before the injection of the contrast medium in the zone to be imaged, with the algorithm according to the present invention using the set of functions defined as CM in the above description.

It appears clearly how the metastases have been highlighted, particularly the one enclosed by the pale color circle of FIG. 8D. Also some more little dots above the bigger spot in the pale color circle and at the right hand side of the bigger spot are clearly highlighted. These spots can be seen with different emphasis in the zone encircled by the pale color circle in the different images of FIGS. 8B to 8D. In the original image according to FIG. 8A, the bigger spots and dots can be seen very poorly and the smaller ones are practically very difficult to be identified as alterations of the tissue.

Thus the treatment of a digital or digitalized image with the algorithm according to the present invention can substitute with a high reliance and precision contrast media imaging. This is a very important advantage since on the one hand it is possible to avoid invasive interventions during imaging. Furthermore the use of contrast media during imaging requires the presence of a specialized medical assistant for injecting the contrast medium in a patient. Contrast media imaging, also known as harmonic imaging in the field of ultrasound imaging requires also longer times to be carried out since after injection of the contrast media some time is needed until the contrast medium reaches the tissue to be imaged. Furthermore, it is also difficult to predict when the contrast medium will reach the tissue to be imaged and sometimes it happens that no image can be taken at the correct instant coinciding with the presence of the contrast medium in the tissue to be imaged. Thus, the algorithm according to the present invention allows to overcoming all the difficulties and drawbacks related to imaging with contrast media, which are bigger than the most important ones disclosed above. This can be appreciated by every expert of the field of diagnostic imaging, where a lot of arrangements must be provided in the imaging apparatus for allowing an acquision of images with contrast media, particularly real time images.

FIGS. 9A to 9D illustrate respectively an analog image, namely a radiography of the lung. The image, obtained by treatment with the algorithm according to the present invention respectively using only a set of functions defined above as CM (FIG. 9C) and a treatment of the image according to FIG. 9A by means of the algorithm according to the present invention using a combination of the above mentioned set of functions defined as CM and of the set of functions defined above as IAC (FIG. 9D) are compared with the analogical radiographic image of FIG. 9A and with an image obtained by treating the image of FIG. 9A with a known filtering algorithm called best filter.

The beneficial effects of the algorithm according to the present invention can be appreciated. Particularly, the image of FIG. 9D shows how the filament structure present in the lung is highlighted. In this case the to roughly discretized image of FIG. 9C does not allow highlighting this filament structure, which is depicted in FIG. 9D as black traces in the lower half of the lungs and at the sides of the two lungs facing each other. While the filament structure can be seen in the image according to FIG. 9A, the image according to FIG. 9B does not show this structure. In the image according to FIG. 9C the structure is present, however the differentiation of the image zones is too sharp and rough.

FIG. 10 illustrates three images 10A, 10B, 10C put one beside the other and related to a mammography.

The left hand FIG. 10A is the original mammography, the right hand image 10C is the original mammography, where some nodules are identified by highlighting them with white dots and encircling in white circles. The comparison of the left hand image 10A with the right hand image 10C allows appreciating the very tiny level of differentiation of the image of the nodules from the surrounding image zone. The center image of FIG. 10B is the result of the treatment of the digitalized FIG. 10A by means of the algorithm according to the present invention using only a set of activation rules defined in the above description as High CS.

It appears evident that the algorithm has revealed and clearly highlighted in the obtained treated image the nodules, which have been identified by the human eye and a further great number of nodules which were not apparent by human eye in the original image of FIGS. 10A and 10C.

The example of FIGS. 11A to 11E relates to an image of a landscape and not to a diagnostic image, and is chosen in order to appreciate the accuracy of the algorithm according to the present invention differentiating image zones by maintaining the relevant structure of the original image. This means that the objects depicted in the image can still be recognized after treatment of the image by means of the algorithm according to the invention.

FIG. 11A is a seascape image with a boat in the foreground.

The image may be an image acquired by means of digital techniques such as digital cameras or the like or an image which has been acquired by means of analog techniques and which has been digitalized by means of a scanner or the like.

FIGS. 11B and 11C illustrates the image obtained by treating the image according to FIG. 11A by means of two different known image elaboration algorithms. It appears evident that the subjects of the seascape can hardly be recognized in the images according to FIGS. 11B and 11C.

FIG. 11D illustrates the image according to FIG. 11A after treatment with the algorithm according to the present invention, where only the set of functions has been used defined as IAC in the above description. In this image the subjects of the original image can be recognized much better than in the images of FIGS. 11B and 11C and the different image zones are very well differentiated and recognized.

FIG. 11E illustrates the image obtained by the treatment of FIG. 11A with the algorithm according to the present invention, where a set of functions defined as CM in the above description has been used in combination with a set of functions defined as IAC in the above description. The result of this treatment is that the image zones having a certain impact on the viewer are enhanced. So the land in the background and the boat in the foreground are enhanced with respect to the sea.

It is further to be noted that the present algorithm can be applied in combination with other algorithm such as artificial neural networks or other prediction algorithm which are trained and tested to recognize the kind of tissue or structure of the material composing an image.

In this case instead of feeding to the image recognition algorithm using the image data array as passive information for training and testing the image data of the digital or digitalized original image, this data can be subjected previously to treatment by means of the present algorithm in one of the forms disclosed above.

In order to ensure a greater accuracy of the prediction, the treatment of the image data of the original image by means of the algorithm according to the present invention can be carried out several times each time using a different set of learning functions or rules or a different set of activation functions or rules or a different combination thereof or using a sequence of treatment of the original image data, in which each treatment phase uses a different set of learning functions or rules or a different set of activation functions or rules or a different combination thereof. The prediction algorithm being applied to the image data obtained by each treatment and then the results of each prediction may be combined together or compared one with the other.

FIGS. 12A to 12J illustrates further examples of elaboration of a same source image by means of the method according to the invention, in which different set of rules or combination thereof are applied.

Figure 12A:
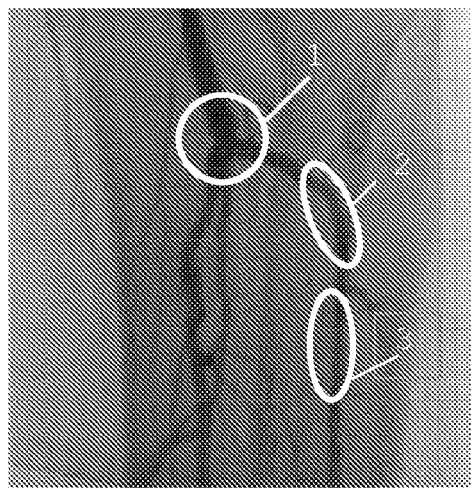
Figure 12B:
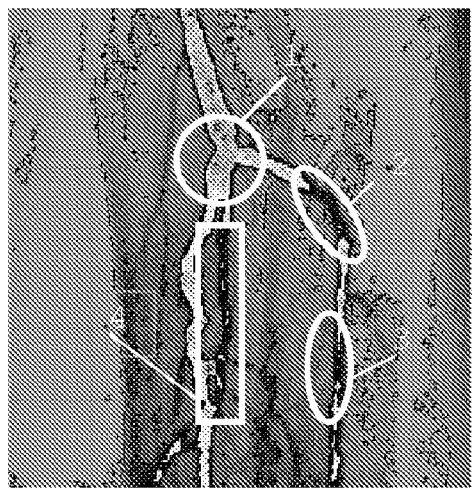

FIG. 12A is the source image which is a radiography of the femoral artery.

In the source image a circle and two ellipse indicated respectively with 1, 2 and 3 encircle particulars of the vessels where a stenosis could be revealed. While the stenosis identified by the circle 1 appears in a sure way also in the source image, the zones encircled by the ellipses 2 and 3 do not give sure information.

The first image 12B is obtained by the method according to the invention in which the set of rules V uses the rem function. Here the constriction at 2 and 3 of the right hand branch of the artery can be seen much better while also the central branch indicated by a rectangle 4 appears visible. The structure at the interior of the arterial branches does not appear very clearly.

Figure 12C:
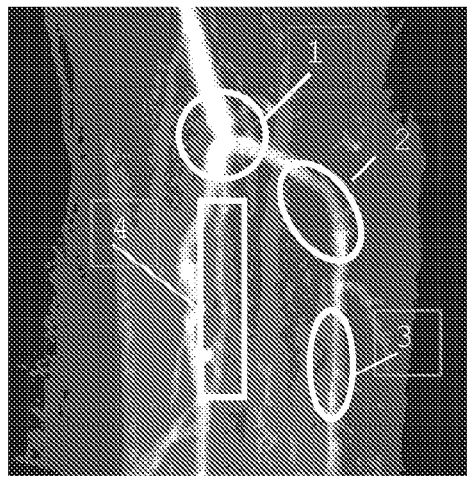

FIG. 12C illustrates the image obtained by elaborating the source image with the set of rules V so called CM, this time using only the option quot. Four classes of grey levels can be seen indicating different zones, namely three grey levels and white. The zones classified by quot do not show any further structure. In an y case the constrictions at 1, 2, 3, and 4 can be already identified in the output image.

Figure 12D:
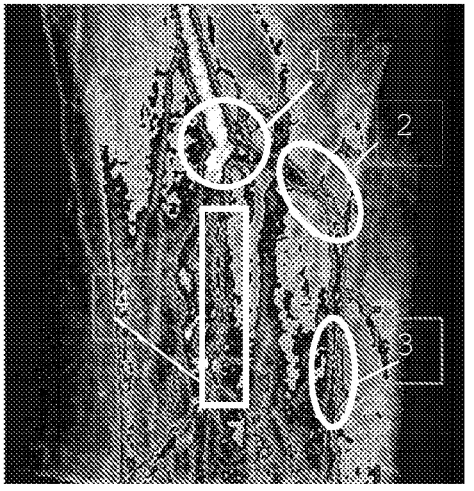

FIG. 12D shows the result of applying rules V by taking into consideration both the quot and the rem function. In this case the four image zones having one of the four grey level of the image according to FIG. 12C are modulated by the rem function, namely the grey scale of image 12A. The four image zones having different grey levels are further modulated by the rem function and so a structure can be recognized. The constrictions at 1, 2, 3 and 4 appear more clearly than in the previous images.

Figure 12E:
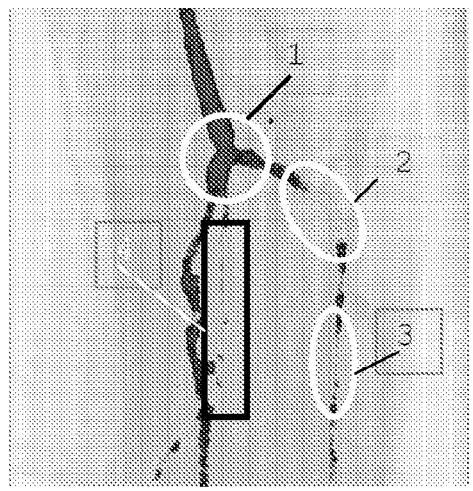

FIG. 12E illustrates the result of elaborating the source image 12A by means of the rules according to example V and by using the true color option, where the pixel values elaborated are maintained normalized within the interval between 0 and 1. Also in this case it is possible to recognize the constrictions of the arterial at 1, 2, 3 and 4.

Figure 12F:
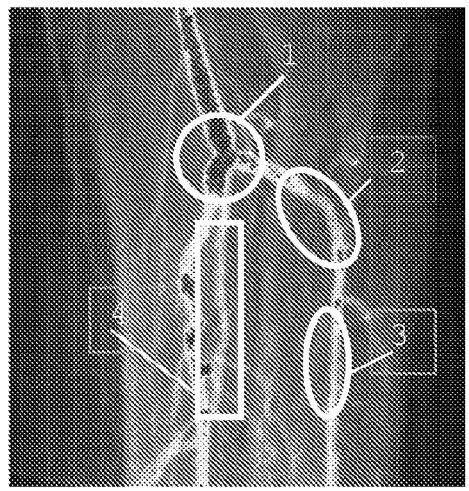

FIG. 12F is the image obtained by elaborating the source image with the local sine algorithm according to the first option. Also in this case the presence of the constrictions appears evident at 1, 2, 3 and 4.

The four FIGS. 12G to 12J illustrates the result obtained by elaborating the source image 12A by a combination of two elaboration steps or stages each one carried out by means of the set of rules according to example V or VI.

Figure 12G:
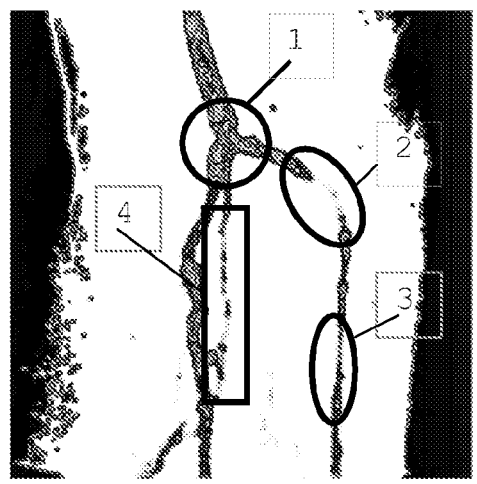

Image of FIG. 12G is obtained by first carrying out an elaboration with the set of rules according to example VI second option, namely the so called LS2 set of rules and by submitting the output image obtained by this first elaboration to a second elaboration this time using the set of rules V so called CM applying the rem and quot functions.

Figure 12H:
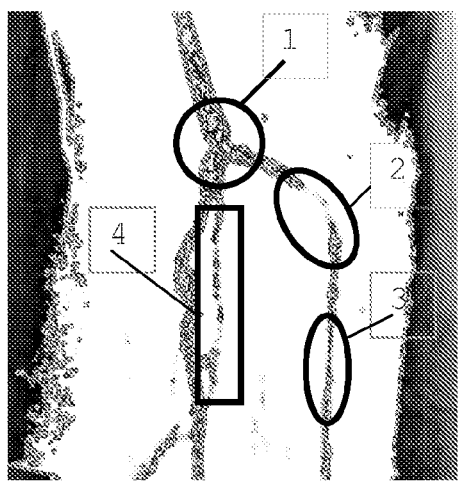

FIG. 12H illustrates a variant of the elaboration carried out for FIG. 12G, in which the output image obtained by the elaboration with the set of rules according to example VI second option the so called LS2 set of rules, is further elaborated with the set of rules according to example V, the so called CM, this time using only the rem function.

Figure 12I:
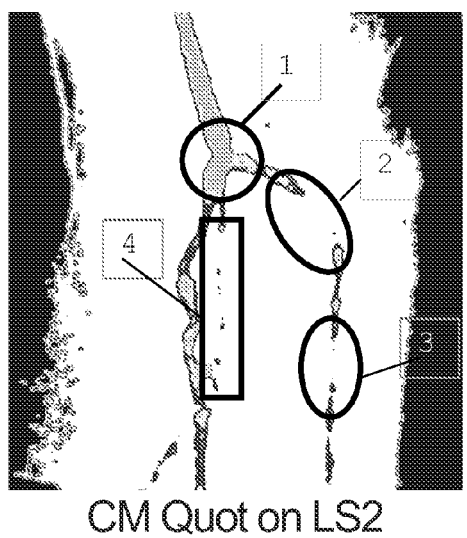

FIG. 12I is a similar way of elaborating the source image 12A as in FIG. 12H, this time the second elaboration stage is carried out by using the set of rules of example V by applying only the quot function.

Figure 12J:
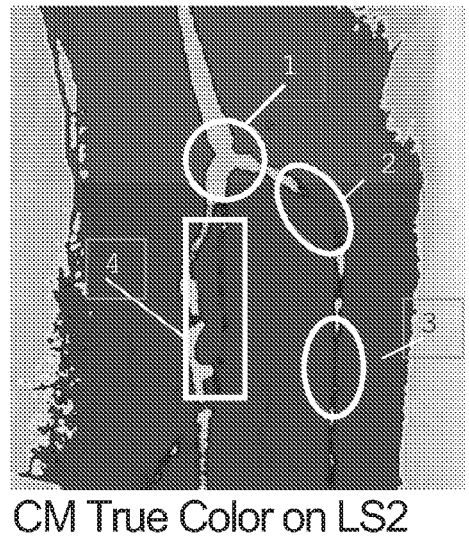

FIG. 12J is still another variant of the two stage elaboration according to the previous examples of FIG. 12G to 12I, where the set of rules of example V is used for the second elaboration, this time by applying the True Color variant.

Although the images are all shown in a grey scale palette, it is possible to define colors and to correlate the different zones of the image to a specific color, thus obtaining an artificially colored image which better enhances the different zones of the image and the different objects identified by the elaboration according to the method of the present invention.

Furthermore it has to be stressed that although the example described is limited to applying the algorithm according to the present invention to an array of image data, this is not the only field where this algorithm can be applied, since treatment is permitted of every kind of database where the data are of the kind that can be represented as an array of points or cells, each point or cell being univocally related to a data record of the database and the position of each point or cell in the array relatively to the other points or cell being a relevant feature of the data record associated to said point in order to reveal any sort of relation between the data records of the database.

The invention claimed is:

1. A method for carrying out contrast imaging or harmonic imaging in biological tissues without providing the presence of contrast media comprising:
   acquiring an image array representing an ultrasound or MRI or radiographic image of a certain body or of a certain part of a body; and
   subjecting the acquired image data array is subjected to a method of image processing comprising:
   forming an image by a two or three dimensional array of pixels, and
   having each pixel of the array form a unit or knot of an artificial neural network,
   wherein an input and an output of the artificial neural network is formed by original values of the pixels corresponding to each unit and by a computed value of each pixel, and
   wherein a computation of an output value of each one of the knots is carried out as a function of the values at least some of the pixels surrounding the knot,
   using a neural network comprising:
   a n-dimensional array of cells ($K_i$) corresponding to the knots of the neural network, each cell having connections to the directly adjacent cells ($K_j$) forming the neighborhood of the a cell ($K_i$);
   each cell ($K_i$) having an input for each connection to a directly adjacent cell of the surrounding cells ($K_j$);
   each cell ($K_i$) having an output for the connection to one or more of the directly adjacent cells ($K_j$);
   the connection between each cell ($K_i$) and the directly adjacent cells being determined by weights ($w_{ij}$);
   each cell being characterized by an internal value defined as the activation value or function ($A_i$) of the cell ($K_i$);
   each cell ($K_i$) being able to carry out signal processing according to a signal processing function so called transfer function for generating a cell output signal ($u_i$);
   the transfer function determining the output signal ($u_i$) of a cell ($K_i$) as a function of the activation value or function ($A_i$) of the cell ($K_i$), which transfer function comprising also the identity function which puts the activation value or function ($A_i$) of the cell ($K_i$) equal to the output signal ($u_i$) of a cell ($K_i$);
   a n-dimensional database of input data records ($P_i$) being provided which has to be submitted to computation using the neural network and in which n-dimensional database the relative position of the data records ($P_i$) when projected in a corresponding n-dimensional space is a relevant feature of the data records ($P_i$), the data records ($P_i$) of the database being able to be represented by an array of points in the said n-dimensional space, each point having an univocally defined position in the said array of points and being univocally related to a data record ($P_i$) of the said database, each data record ($P_i$) of the said database comprising further at least one variable or more variables each one having a certain value ($U_i$);
   each data record ($P_i$) being univocally associated to a cell ($K_i$) of the n-dimensional array of cells forming the neural network which cells ($K_i$) has the same position in the n-dimensional array of cells ($K_i$) as the corresponding data record ($P_i$) represented by a point in the said n-dimensional array of points;
   the value ($U_i$) of the variables of each data record ($P_i$) being considered as the initialization value of the network being taken as the initial activation value ($A_i$) or the initial output value ($U_i$) of the univocally associated cell ($K_i$); and
   the activation value ($A_i$) or the output value ($u_i$) of each cell ($K_i$) after a certain number of iterative processing steps of the neural network being considered as the new value ($U_i$) for the said univocally associated data records ($P_i$),
   wherein:
   for each processing step of the said certain number of iterative processing steps, the weights ($w_{ij}$) defining the connection between each cell ($K_i$) and the directly adjacent cells ($K_j$) are determined as the function of the current values ($U_i$) of the variables of each data record ($P_j$) univocally associated to the cell ($K_j$) directly adjacent to the said cell ($K_i$), the said function being a so called learning function or rule; and
   the current activation value ($A_i$) or the output value ($u_i$) of each cell ($K_i$) after a processing steps of the neural network which is considered as the current new value ($u_i$) for the said univocally associated data records ($P_i$) being determined as a function of the current output values ($U_j$) of the directly adjacent cells ($K_j$) weighted by the corresponding weight ($w_{ij}$) defining the connection of the directly adjacent cells ($K_j$) with the cell ($K_i$).

2. The method according to claim 1, wherein between each knot or unit of the artificial neural network corresponding univocally to a pixel of the array of pixels forming the image and the related units or knots of at least gradient 1 weighted connections are provided.

3. The method according to claim 1, wherein a weight optimization is carried out.

4. The method according to claim 3, wherein unit activation is carried out after weight optimization.

5. The method according to claim 1, wherein weight evolution and unit activation are carried out.

6. The method according to claim 1, wherein the neural network is provided with a set of rules as follows:

$$k = \frac{\sigma}{2^N}$$

$$R_{ij} = e^{-(k \cdot u_i - k \cdot u_j)^2} \qquad u \in [0, 2^N]$$

$$R'_{ij} = \left(R_{ij} - \frac{1-\varepsilon}{2}\right) \cdot C \qquad C = 5; \varepsilon = e^{-\frac{\sigma^2}{4}}$$

$$w_{ij} = \frac{e^{R'_{ij}} - e^{-R'_{ij}}}{e^{R'_{ij}} + e^{-R'_{ij}}}$$

where:
σ is a parameter which is freely defined by the user and which renders the algorithm sensible to differences in the image,
N is a local neighborhood;
$R_{ij}$ is a measure for the distance of the i-th unit from the j-th unit,
$u_j$ are the values of the single cells $P_i$ transformed in knots $K_i$ of the artificial neural network, and
the suffix i defines the central cell or knot and the suffix j defines the cells or knots directly surrounding the said central cell or knot.

7. The method according to claim 6, wherein the set of rules further comprises:
(a) Learning $$u \in [0, 1]; C = \text{neighbors}; w_{ij} = 0.0001 \text{ Initialization}$$

$$\Delta w_{ij} = u_i - (u_j \cdot w_{ij}) \cdot \left(1 - \frac{w_{ij}}{C}\right) \cdot u_j$$

$$w_{ij}^{[n+1]} = w_{ij}^{[n]} + \Delta w_{ij}$$

$$Out_i(rem, quot) = \text{mod}\left(\frac{\sum_{k \neq i}^{N} w_{i,k}}{N} \cdot MaxPixel, MaxPixel\right)$$

(b) Recall $$NewW_{ji} = NewW_{ij} = w_{ij} - \overline{w}$$

where:
N is a local neighborhood;
$u_i$ is the value of the central cell or knot $K_i$,
$u_j$ are the values of the surrounding knots $K_j$,
$w_{ij}$ indicates the weights of the connection of the surrounding knots $K_j$ and the central knot $K_i$,
$w_{ij}^{[n]}$ defines the weights of the connection in the n-th cycle,
$w_{ij}^{[n+1]}$ defines the weight of the connections in the n+1-th cycle,
$\Delta w_{ij}$ is the value which has to be added to the weights $W_{ij}$ to update the weights $W_{ij}$ for the next cycle,
$Out_i$ is the output value of the i-th unit corresponding to the i-th pixel which is the target unit or pixel,
$NewW_{ij}$ is the new weight of the connection between j-th and i-th unit,
$\overline{w}$ is the mean value of the weight,
the argument quot relates to the integer quotient of the output value of each unit and the number of steps in a scale of representing the said value, and
the argument rem relates to the rest of the integer quotient.

8. The method according to claim 6, wherein the method uses a set of learning and or activation rules as follows:
(a) Learning $$u \in [0, 1]; C = \text{neighbors}; w_o = 0.0001 \text{ Initialization}$$

$$\Delta w_{ij} = u_i - (u_j \cdot w_{ij}) \cdot \left(1 - \frac{w_{ij}}{C}\right) \cdot u_j$$

$$w_{ij}^{[n+1]} = w_{ij}^{[n]} + \Delta w_{ij}$$

$$Out_i(rem, quot) = \text{mod}\left(\frac{\sum_{k \neq i}^{N} w_{i,k}}{N} \cdot MaxPixel, MaxPixel\right)$$

(b) Recall $$NewW_{ji} = NewW_{ij} = w_{ij} - \overline{w}$$

where:
N is a local neighborhood;
$u_i$ is the value of the central cell or knot $K_i$,
$u_j$ are the values of the surrounding knots $K_j$,
$w_{ij}$ indicates the weights of the connection of the surrounding knots $K_j$ and the central knot $K_i$,
$w_{ij}^{[n]}$ defines the weights of the connection in the n-th cycle,
$w_{ij}^{[n+1]}$ defines the weight of the connections in the n+1-th cycle,
$\Delta w_{ij}$ is the value which has to be added to the weights, $W_{ij}$ in order to update then for the next cycle,
$Out_i$ is the output value of the i-th unit corresponding to the i-th pixel which is the target unit or pixel,
$NewW_{ij}$ is the new weight of the connection between j-th and i-th unit,
$\overline{w}$ is the mean value of the weight,
the argument quot relates to the integer quotient of the output value of each unit and the number of steps in a scale of representing said value, and
the argument rem relates to the rest of the integer quotient.

9. The method according to claim 8, wherein at least two image elaboration stages are provided, the first elaboration stage being carried out with one set of learning and/or activation rules, while the second elaboration stage is carried out by submitting the pixel values of the output image elaborated in the first stage to a second elaboration with a second set of learning and/or activation rules.

10. The method according to claim 9, wherein at least a third or more elaboration stages are provided each one carried out with a different set of learning and/or activation rules.

11. The method according to claim 8, wherein the following learning and/or activation rules:

$$k = \frac{\sigma}{2^N}$$

-continued $$R_{ij} = e^{-(k \cdot u_i - k \cdot u_j)^2} \qquad u \in [0, 2^N]$$

$$R'_{ij} = \left(R_{ij} - \frac{1-\varepsilon}{2}\right) \cdot C \qquad C = 5; \varepsilon = e^{-\frac{\sigma^2}{4}}$$

$$w_{ij} = \frac{e^{R'_{ij}} - e^{-R'_{ij}}}{e^{R'_{ij}} + e^{-R'_{ij}}}$$

σ is a parameter which is freely definable by the user and which renders the algorithm sensible to differences in the image, $R_{ij}$ is a measure for the distance of the i-th unit from the j-th unit, $u_i$ are the values of the single cells $P_i$ transformed in knots $K_i$ of the artificial neural network, and the suffix i defines the central cell or knot and the suffix j defines the cells or knots directly surrounding the said central cell or knot.

12. A method for helping in identifying tumoral tissues comprising the steps of:
  acquiring a digital image or a digitized analogical image of the anatomical district containing biological tissues for analysis; and
  identifying tumoral tissues by elaborating the said digital or digitalize image using an image processing method comprising:
  forming an image by a two or three dimensional array of pixels; and
  having each pixel of the array form a unit or knot of an artificial neural network,
  wherein an input and an output of the artificial neural network is formed by original values of the pixels corresponding to each unit and by a computed value of each pixel, and
  wherein a computation of an output value of each one of the knots is carried out as a function of the values at least some of the pixels surrounding the knot,
  wherein the artificial neural network comprises:
  a n-dimensional array of cells ($K_i$) corresponding to the knots of the neural network, each cell having connections to the directly adjacent cells ($K_j$) forming the neighborhood of the a cell ($K_i$);
  each cell ($K_i$) having an input for each connection to a directly adjacent cell of the surrounding cells ($K_j$);
  each cell ($K_i$) having an output for the connection to one or more of the directly adjacent cells ($K_j$);
  the connection between each cell ($K_i$) and the directly adjacent cells being determined by weights ($w_{ij}$);
  each cell being characterized by an internal value defined as the activation value or function ($A_i$) of the cell ($K_i$);
  each cell ($K_i$) being able to carry out signal processing according to a signal processing function so called transfer function for generating a cell output signal ($u_i$);
  the transfer function determining the output signal ($u_i$) of a cell ($K_i$) as a function of the activation value or function ($A_i$) of the cell ($K_i$), which transfer function comprising also the identity function which puts the activation value or function ($A_i$) of the cell ($K_i$) equal to the output signal ($u_i$) of a cell ($K_i$);
  a n-dimensional database of input data records ($P_i$) being provided which has to be submitted to computation using the neural network and in which n-dimensional database the relative position of the data records ($P_i$) when projected in a corresponding n-dimensional space is a relevant feature of the data records ($P_i$), the data records ($P_i$) of the database being able to be represented by an array of points in the said n-dimensional space, each point having an univocally defined position in the said array of points and being univocally related to a data record ($P_i$) of the said database, each data record ($P_i$) of the said database comprising further at least one variable or more variables each one having a certain value ($U_i$);
  each data record ($P_i$) being univocally associated to a cell ($K_i$) of the n-dimensional array of cells forming the neural network which cells ($K_i$) has the same position in the n-dimensional array of cells ($K_i$) as the corresponding data record ($P_i$) represented by a point in the said n-dimensional array of points;
  the value ($U_i$) of the variables of each data record ($P_i$) being considered as the initialization value of the network being taken as the initial activation value ($A_i$) or the initial output value ($U_i$) of the univocally associated cell ($K_i$); and
  the activation value ($A_i$) or the output value ($u_i$) of each cell ($K_i$) after a certain number of iterative processing steps of the neural network being considered as the new value ($U_i$)) for the said univocally associated data records ($P_i$);
  wherein:
  for each processing step of the said certain number of iterative processing steps, the weights ($w_{ij}$) defining the connection between each cell ($K_i$) and the directly adjacent cells ($K_j$) are determined as the function of the current values ($U_j$) of the variables of each data record (Pj) univocally associated to the cell ($K_j$) directly adjacent to the said cell ($K_i$), the said function being a so called learning function or rule; and
  the current activation value ($A_i$) or the output value ($u_i$) of each cell ($K_i$) after a processing steps of the neural network which is considered as the current new value ($u_i$) for the said univocally associated data records ($P_i$) being determined as a function of the current output values ($u_j$) of the directly adjacent cells ($K_j$) weighted by the corresponding weight ($w_{ij}$) defining the connection of the directly adjacent cells ($K_j$) with the cell ($K_j$).

13. The method according to claim 12, wherein between each knot or unit of the artificial neural network corresponding univocally to a pixel of the array of pixels forming the image and the related units or knots of at least gradient 1 weighted connections are provided.

14. The method according to claim 12, wherein a weight optimization is carried out.

15. The method according to claim 14, wherein unit activation is carried out after weight optimization.

16. The method according to claim 12, wherein weight evolution and unit activation are carried out.

17. The method according to claim 12, wherein:
  the method is a method for image pattern recognition,
  the image is a digital image or an analogical image which has been digitized,
  the array of image data is formed by a finite number of points or cells each one corresponding to an image unitary element comprising a pixel or voxel,
  each pixel or voxel is related to a value of a parametric variable describing the intensity or the level of grey of the pixels in a grey scale image or each pixel or voxel is related to a vector,
  each component of the vector is a parametric variable describing the intensity of the pixel or voxel and the color of the pixel or voxel,
  the array of image data is subjected to processing with the artificial neural network, the cells or points of the data records of gradient 1 are formed by the pixels or voxels directly surrounding a target pixel or voxel, the algorithm is applied a certain number of times for carrying out a certain number of repetitions of the computation cycle, which number is a fixed defined number, or is computed on the basis of a variance or difference of the output values for the pixels at a certain repetition of the computation cycle and of the original values of the image data array, or which number of repetitions of the computation cycle is determined as the number of repetition at which the following computation cycles furnishes an output for the image data array, and the difference from the output for the image data array of the previous computation cycle is less than a certain predetermined difference.

18. The method according to claim 17 applied for image pattern recognition, wherein:

the artificial neural network is implemented as an algorithm for recognizing relationships between data of a database, the data is of the kind where the relative position of the data records in an array of data records or in a distribution of data records in a N-dimensional space is a relevant feature of the data record and where the data records are representable as an array of cells or points, each point is univocally related to a data record of the database and has a univocally defined position in the array relatively to the cells or points of the other data records, at least one variable or more variables is associated to each data record, each one having a certain value, and each cell or point in the array of cells of points representing a data records of a database is considered to be a unit or a knot of the artificial neural network.

19. The method according to claim 18, wherein the algorithm is applied two times in succession one of the other, at each time being used a different set of learning rules or functions or a different set of activation rules or functions or a different combination thereof.

20. The method according to claim 18, wherein the algorithm is applied in combination with a predictive algorithm learned for recognizing features of different zones of an imaged subject.

21. The method according to claim 20, wherein the predictive algorithm is an artificial neural network and the learning and testing database is formed by a set of images of identical subjects, the different imaged zones of the said image subject being univoquely identified for each image of the training and testing database, while the prediction algorithm is carried out on the image data array obtained as an output of the elaboration carried out with the algorithm implementing the artificial neural network.

22. The method according to claim 21, wherein the prediction algorithm is carried out also using the original image data array as an input data while the prediction results obtained by the carrying out of the prediction algorithm on the image data array computed with the algorithm implementing the artificial neural network and the prediction results obtained carrying out the prediction algorithm on the original image data array are combined or compared.

23. A method for helping in identifying stenosis in blood vessels comprising the steps of:

acquiring a digital image or a digitized analogical image of the anatomical district containing biological tissues for analysis; and identifying stenosis in blood vessels in the tissues by elaborating said digital or digitized analogical image using an image processing method comprising:

forming an image by a two or three dimensional array of pixels; and having each pixel of the array form a unit or knot of an artificial neural network, wherein an input and an output of the artificial neural network is formed by original values of the pixels corresponding to each unit and by a computed value of each pixel, and wherein a computation of an output value of each one of the knots is carried out as a function of the values at least some of the pixels surrounding the knot, wherein the artificial neural network comprises:

a n-dimensional array of cells ($K_i$) corresponding to the knots of the neural network, each cell having connections to the directly adjacent cells ($K_i$) forming the neighborhood of the a cell ($K_i$);

each cell ($K_j$) having an input for eachconnrction to a directly adjacent cell of the surrounding cell ($K_j$)

each cell ($K_i$) having an output for the connection to one or more of the directly adjacent cells ($K_j$);

the connection between each cell ($K_i$) and the directly adjacent cells being determined by weights ($w_{ij}$);

each cell being characterized by an internal value defined as the activation value or function ($A_i$) of the cell ($K_i$);

each cell ($K_i$) being able to carry out signal processing according to a signal processing function so called transfer function for generating a cell output signal ($u_i$);

the transfer function determining the output signal ($u_i$) of a cell ($K_i$) as a function of the activation value or function ($A_i$) of the cell ($K_i$), which transfer function comprising also the identity function which puts the activation value or function ($A_i$) of the cell ($K_i$) equal to the output signal ($u_i$) of a cell ($K_i$);

a n-dimensional database of input data records ($P_i$) being provided which has to be submitted to computation using the neural network and in which n-dimensional database the relative position of the data records ($P_i$) when projected in a corresponding n-dimensional space is a relevant feature of the data records ($P_i$), the data records ($P_i$) of the database being able to be represented by an array of points in the said n-dimensional space, each point having an univocally defined position in the said array of points and being univocally related to a data record ($P_i$) of the said database, each data record ($P_i$) of the said database comprising further at least one variable or more variables each one having a certain value ($U_i$), each data record ($P_i$) being univocally associated to a cell ($K_i$) of the n-dimensional array of cells forming the neural network which cells ($K_i$) has the same position in the n-dimensional array of cells ($K_i$) as the corresponding data record ($P_i$) represented by a point in the said n-dimensional array of points;

the value ($U_i$) of the variables of each data record ($P_i$) being considered as the initialization value of the network being taken as the initial activation value ($A_i$) or the initial output value ($U_i$) of the univocally associated cell ($K_i$); and the activation value ($A_i$) or the output value ($u_i$) of each cell ($K_i$) after a certain number of iterative processing steps of the neural network being considered as the new value ($U_i$) for the said univocally associated data records ($P_i$);

wherein:

for each processing step of the said certain number of iterative processing steps, the weights ($w_{ij}$) defining the connection between each cell ($K_i$) and the directly adjacent cells ($K_j$) are determined as the function of the current values ($U_j$) of the variables of each data record (Pj) univocally associated to the cell ($K_j$) directly adjacent to the said cell ($K_i$), the said function being a so called learning function or rule; and the current activation value ($A_i$) or the output value ($u_i$) of each cell ($K_i$) after a processing steps of the neural network which is considered as the current new value ($u_i$) for the said univocally associated data records ($P_i$) being determined as a function of the current output values ($u_j$) of the directly adjacent cells ($K_j$) weighted by the corresponding weight ($w_{ij}$) defining the connection of the directly adjacent cells ($K_i$) with the cell ($K_j$).

24. The method according to claim 23, wherein between each knot or unit of the artificial neural network corresponding univocally to a pixel of the array of pixels forming the image and the related units or knots of at least gradient 1 weighted connections are provided.

25. The method according to claim 23, wherein a weight optimization is carried out.

26. The method according to claim 25, wherein unit activation is carried out after weight optimization.

27. The method according to claim 23, wherein weight evolution and unit activation are carried out.

28. The method according to claim 23, wherein:
the method is a method for image pattern recognition,
the image is a digital image or an analogical image which has been digitalized,
the array of image data is formed by a finite number of points or cells each one corresponding to an image unitary element comprising a pixel or voxel,
each pixel or voxel is related to a value of a parametric variable describing the intensity or the level of grey of the pixels in a grey scale image or each pixel or voxel is related to a vector,
each component of the vector is a parametric variable describing the intensity of the pixel or voxel and the color of the pixel or voxel,
the array of image data is subjected to processing with the artificial neural network,
the cells or points of the data records of gradient 1 are formed by the pixels or voxels directly surrounding a target pixel or voxel,
the algorithm is applied a certain number of times for carrying out a certain number of repetitions of the computation cycle, which number is a fixed defined number, or is computed on the basis of a variance or difference of the output values for the pixels at a certain repetition of the computation cycle and of the original values of the image data array, or which number of repetitions of the computation cycle is determined as the number of repetition at which the following computation cycles furnishes an output for the image data array, and
the difference from the output for the image data array of the previous computation cycle is less than a certain predetermined difference.

29. The method according to claim 28 applied for image pattern recognition, wherein:
the artificial neural network is implemented as an algorithm for recognizing relationships between data of a database,
the data is of the kind where the relative position of the data records in an array of data records or in a distribution of data records in a N-dimensional space is a relevant feature of the data record and where the data records are representable as an array of cells or points,
each point is univocally related to a data record of the database and has a univocally defined position in the array relatively to the cells or points of the other data records,
at least one variable or more variables is associated to each data record, each one having a certain value, and
each cell or point in the array of cells of points representing a data records of a database is considered to be a unit or a knot of the artificial neural network.

30. The method according to claim 29, wherein the algorithm is applied two times in succession one of the other, at each time being used a different set of learning rules or functions or a different set of activation rules or functions or a different combination thereof.

31. The method according to claim 29, wherein the algorithm is applied in combination with a predictive algorithm learned for recognizing features of different zones of an imaged subject.

32. The method according to claim 31, wherein the predictive algorithm is an artificial neural network and the learning and testing database is formed by a set of images of identical subjects, the different imaged zones of the said image subject being univoquely identified for each image of the training and testing database, while the prediction algorithm is carried out on the image data array obtained as an output of the elaboration carried out with the algorithm implementing the artificial neural network.

33. The method according to claim 32, wherein the prediction algorithm is carried out also using the original image data array as an input data while the prediction results obtained by the carrying out of the prediction algorithm on the image data array computed with the algorithm implementing the artificial neural network and the prediction results obtained carrying out the prediction algorithm on the original image data array are combined or compared.

34. A method for helping in identifying calcifications in biological tissues comprising the steps of:
acquiring a digital image or a digitized analogical image of the anatomical district containing biological tissues for analysis; and
identifying calcifications in the biological tissues by elaborating said digital or digitized analogical image using an image processing method comprising:
forming an image by a two or three dimensional array of pixels; and
having each pixel of the array form a unit or knot of an artificial neural network,
wherein an input and an output of the artificial neural network is formed by original values of the pixels corresponding to each unit and by a computed value of each pixel, and
wherein a computation of an output value of each one of the knots is carried out as a function of the values at least some of the pixels surrounding the knot,
wherein the artificial neural network comprises:
a n-dimensional array of cells ($K_i$) corresponding to the knots of the neural network, each cell having connections to the directly adjacent cells ($K_j$) forming the neighborhood of the a cell ($K_i$);
each cell ($K_i$) having an input for each connection to a directly adjacent cell of the surrounding cells ($K_j$);
each cell ($K_i$) having an output for the connection to one or more of the directly adjacent cells ($K_j$);
the connection between each cell ($K_i$) and the directly adjacent cells being determined by weights ($w_{ij}$);
each cell being characterized by an internal value defined as the activation value or function ($A_i$) of the cell ($K_i$);

each cell ($K_i$) being able to carry out signal processing according to a signal processing function so called transfer function for generating a cell output signal ($u_i$);

the transfer function determining the output signal ($u_i$) of a cell ($K_i$) as a function of the activation value or function ($A_i$) of the cell ($K_i$), which transfer function comprising also the identity function which puts the activation value or function ($A_i$) of the cell ($K_i$) equal to the output signal ($u_i$) of a cell ($K_i$);

a n-dimensional database of input data records ($P_j$) being provided which has to be submitted to computation using the neural network and in which n-dimensional database the relative position of the data records ($P_j$) when projected in a corresponding n-dimensional space is a relevant feature of the data records ($P_j$), the data records ($P_j$) of the database being able to be represented by an array of points in the said n-dimensional space, each point having an univocally defined position in the said array of points and being univocally related to a data record ($P_j$) of the said database, each data record ($P_j$) of the said database comprising further at least one variable or more variables each one having a certain value ($U_i$);

each data record ($P_j$) being univocally associated to a cell ($K_i$) of the n-dimensional array of cells forming the neural network which cells ($K_i$) has the same position in the n-dimensional array of cells ($K_i$) as the corresponding data record ($P_j$) represented by a point in the said n-dimensional array of points;

the value ($U_i$) of the variables of each data record ($P_j$) being considered as the initialization value of the network being taken as the initial activation value ($A_i$) or the initial output value ($U_i$) of the univocally associated cell ($K_i$); and the activation value ($A_i$) or the output value ($u_i$) of each cell ($K_i$) after a certain number of iterative processing steps of the neural network being considered as the new value ($U_i$) for the said univocally associated data records ($P_j$);

wherein:

for each processing step of the said certain number of iterative processing steps, the weights ($w_{ij}$) defining the connection between each cell ($K_i$) and the directly adjacent cells ($K_j$) are determined as the function of the current values ($U_i$) of the variables of each data record (Pj) univocally associated to the cell ($K_j$) directly adjacent to the said cell ($K_i$), the said function being a so called learning function or rule; and the current activation value ($A_i$) or the output value ($u_i$) of each cell ($K_i$) after a processing steps of the neural network which is considered as the current new value ($u_i$) for the said univocally associated data records ($P_j$) being determined as a function of the current output values ($u_j$) of the directly adjacent cells ($K_j$) weighted by the corresponding weight ($w_{ij}$) defining the connection of the directly adjacent cells ($K_j$) with the cell ($K_i$).

35. The method according to claim 34, wherein between each knot or unit of the artificial neural network corresponding univocally to a pixel of the array of pixels forming the image and the related units or knots of at least gradient 1 weighted connections are provided.

36. The method according to claim 34, wherein a weight optimization is carried out.

37. The method according to claim 36, wherein unit activation is carried out after weight optimization.

38. The method according to claim 34, wherein weight evolution and unit activation are carried out.

39. The method according to claim 34, wherein:

the method is a method for image pattern recognition, the image is a digital image or an analogical image which has been digitalized, the array of image data is formed by a finite number of points or cells each one corresponding to an image unitary element comprising a pixel or voxel, each pixel or voxel is related to a value of a parametric variable describing the intensity or the level of grey of the pixels in a grey scale image or each pixel or voxel is related to a vector, each component of the vector is a parametric variable describing the intensity of the pixel or voxel and the color of the pixel or voxel, the array of image data is subjected to processing with the artificial neural network, the cells or points of the data records of gradient 1 are formed by the pixels or voxels directly surrounding a target pixel or voxel, the algorithm is applied a certain number of times for carrying out a certain number of repetitions of the computation cycle, which number is a fixed defined number, or is computed on the basis of a variance or difference of the output values for the pixels at a certain repetition of the computation cycle and of the original values of the image data array, or which number of repetitions of the computation cycle is determined as the number of repetition at which the following computation cycles furnishes an output for the image data array, and the difference from the output for the image data array of the previous computation cycle is less than a certain predetermined difference.

40. The method according to claim 39 applied for image pattern recognition, wherein:

the artificial neural network is implemented as an algorithm for recognizing relationships between data of a database, the data is of the kind where the relative position of the data records in an array of data records or in a distribution of data records in a N-dimensional space is a relevant feature of the data record and where the data records are representable as an array of cells or points, each point is univocally related to a data record of the database and has a univocally defined position in the array relatively to the cells or points of the other data records, at least one variable or more variables is associated to each data record, each one having a certain value, and each cell or point in the array of cells of points representing a data records of a database is considered to be a unit or a knot of the artificial neural network.

41. The method according to claim 40, wherein the algorithm is applied two times in succession one of the other, at each time being used a different set of learning rules or functions or a different set of activation rules or functions or a different combination thereof.

42. The method according to claim 40, wherein the algorithm is applied in combination with a predictive algorithm learned for recognizing features of different zones of an imaged subject.

43. The method according to claim 42, wherein the predictive algorithm is an artificial neural network and the learning and testing database is formed by a set of images of identical subjects, the different imaged zones of the said image subject being univoquely identified for each image of the training and testing database, while the prediction algorithm is carried out on the image data array obtained as an output of the elaboration carried out with the algorithm implementing the artificial neural network.

44. The method according to claim 43, wherein the prediction algorithm is carried out also using the original image data array as an input data while the prediction results obtained by the carrying out of the prediction algorithm on the image data array computed with the algorithm implementing the artificial neural network and the prediction results obtained carrying out the prediction algorithm on the original image data array are combined or compared.

* * * * *